(12) United States Patent
Kim et al.

(10) Patent No.: US 10,841,612 B2
(45) Date of Patent: *Nov. 17, 2020

(54) METHOD AND APPARATUS FOR PROCESSING VIDEO DATA

(71) Applicant: LG Electronics Inc., Seoul (KR)

(72) Inventors: Jungsun Kim, Seoul (KR); Seungwook Park, Seoul (KR); Jaehyun Lim, Seoul (KR); Joonyoung Park, Seoul (KR); Younghee Choi, Seoul (KR); Jaewon Sung, Seoul (KR); Byeongmoon Jeon, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,283

(22) Filed: May 14, 2019

(65) Prior Publication Data

US 2019/0268621 A1     Aug. 29, 2019

Related U.S. Application Data

(63) Continuation of application No. 15/915,211, filed on Mar. 8, 2018, now Pat. No. 10,321,156, which is a
(Continued)

(51) Int. Cl.
*H04N 19/176* (2014.01)
*H04N 19/593* (2014.01)
(Continued)

(52) U.S. Cl.
CPC ......... *H04N 19/593* (2014.11); *H04N 19/107* (2014.11); *H04N 19/11* (2014.11);
(Continued)

(58) Field of Classification Search
CPC ...... H04N 19/107; H04N 19/96; H04N 19/70; H04N 19/122; H04N 19/61; H04N 19/593;
(Continued)

(56) References Cited

U.S. PATENT DOCUMENTS 7,869,501 B2    1/2011  Park
9,008,174 B2    4/2015  Zheng et al.
(Continued)

FOREIGN PATENT DOCUMENTS

CN    101193305    6/2008
CN    101218830    7/2008
(Continued)

OTHER PUBLICATIONS

International Search Report dated Dec. 7, 2011 for Application No. PCT/KR2011/002508, in English, 3 pages.
(Continued)

*Primary Examiner* — Neil R Mikeska
(74) *Attorney, Agent, or Firm* — Fish & Richardson P.C.

(57) ABSTRACT

A method for signalling an intra chroma prediction mode and a method for implementing the signalled intra chroma prediction mode, the intra chroma prediction mode taking an intropolation of previously predicted luma samples from neighboring blocks of video data to attain an intra chroma prediction of a current chroma prediction unit.

20 Claims, 21 Drawing Sheets

Related U.S. Application Data continuation of application No. 15/212,390, filed on Jul. 18, 2016, now Pat. No. 9,918,106, which is a continuation of application No. 14/478,586, filed on Sep. 5, 2014, now Pat. No. 9,426,472, which is a continuation of application No. 13/083,896, filed on Apr. 11, 2011, now Pat. No. 8,861,594.

(60) Provisional application No. 61/454,586, filed on Mar. 21, 2011, provisional application No. 61/454,565, filed on Mar. 20, 2011, provisional application No. 61/453,891, filed on Mar. 18, 2011, provisional application No. 61/453,955, filed on Mar. 17, 2011, provisional application No. 61/322,293, filed on Apr. 9, 2010, provisional application No. 61/322,292, filed on Apr. 9, 2010.

(51) Int. Cl.
| | |
|---|---|
| H04N 19/196 | (2014.01) |
| H04N 19/70 | (2014.01) |
| H04N 19/122 | (2014.01) |
| H04N 19/61 | (2014.01) |
| H04N 19/11 | (2014.01) |
| H04N 19/186 | (2014.01) |
| H04N 19/157 | (2014.01) |
| H04N 19/80 | (2014.01) |
| H04N 19/107 | (2014.01) |
| H04N 19/172 | (2014.01) |
| H04N 19/174 | (2014.01) |
| H04N 19/59 | (2014.01) |
| H04N 19/96 | (2014.01) |

(52) U.S. Cl.
CPC ......... *H04N 19/122* (2014.11); *H04N 19/157* (2014.11); *H04N 19/172* (2014.11); *H04N 19/174* (2014.11); *H04N 19/176* (2014.11); *H04N 19/186* (2014.11); *H04N 19/196* (2014.11); *H04N 19/59* (2014.11); *H04N 19/61* (2014.11); *H04N 19/70* (2014.11); *H04N 19/80* (2014.11); *H04N 19/96* (2014.11)

(58) Field of Classification Search
CPC .... H04N 19/11; H04N 19/186; H04N 19/157; H04N 19/80; H04N 19/196; H04N 19/172; H04N 19/59; H04N 19/174; H04N 19/176
See application file for complete search history.

(56) References Cited

U.S. PATENT DOCUMENTS

| | | |
|---|---|---|
| 2005/0105621 A1 | 5/2005 | Ju |
| 2006/0233250 A1 | 10/2006 | Cha et al. |
| 2007/0110153 A1 | 5/2007 | Cho et al. |
| 2007/0211797 A1 | 9/2007 | Kim |
| 2007/0253486 A1 | 11/2007 | Jeon et al. |
| 2008/0152000 A1 | 6/2008 | Kaushik |
| 2008/0170615 A1 | 7/2008 | Sekiguchi et al. |
| 2008/0175490 A1 | 7/2008 | Cho et al. |
| 2009/0016631 A1 | 1/2009 | Naito et al. |
| 2009/0034856 A1 | 2/2009 | Moriya |
| 2009/0041120 A1 | 2/2009 | Yu |
| 2009/0110067 A1 | 4/2009 | Sekiguchi et al. |
| 2009/0190659 A1 | 7/2009 | Lee et al. |
| 2009/0225866 A1 | 9/2009 | Park |
| 2009/0245384 A1 | 10/2009 | Fukuhara et al. |
| 2009/0245387 A1 | 10/2009 | Hvidsten |
| 2010/0020866 A1 | 1/2010 | Marpe et al. |
| 2011/0038414 A1 | 2/2011 | Song et al. |
| 2011/0200108 A1 | 8/2011 | Joshi et al. |
| 2013/0051469 A1 | 2/2013 | Park et al. |

FOREIGN PATENT DOCUMENTS

| | | |
|---|---|---|
| CN | 101283595 | 10/2008 |
| CN | 101494782 | 7/2009 |
| CN | 101888559 | 11/2010 |
| CN | 2009177352 | 2/2011 |
| CN | 105472386 | 4/2016 |
| CN | 105635737 | 6/2016 |
| EP | 1909508 | 4/2008 |
| EP | 2086239 | 8/2009 |
| KR | 10-2007-0077609 | 7/2007 |
| WO | 2006/109985 | 10/2006 |
| WO | 2007/040335 | 4/2007 |
| WO | 2009/051419 | 4/2009 |
| WO | 2009151615 | 12/2009 |

OTHER PUBLICATIONS

Kim, Yang Soo, Jinwoo Jeong, and Yoonsik Choe. "RGB video coding using the matched neighbourhood block in the inter-color plane." IEICE Electronics Express, vol. 6, No. 24 (2009): pp. 1715-1720.

European Search Report dated Sep. 19, 2014 for European Appln. No. 11003021, 10 pages.

Jianle Chen et al.: "Chroma intra prediction by reconstructed luma samples(JCTVC_C206)", Joint Collaborative Team on Video Coding(JCT-VC) of ITU-T SG16 WP3 and ISO/IEC JTC1/SC29/WG11 3rd Meeting: Guangzhou, CN, Oct. 7-15, 2010, Oct. 11, 2010 (Oct. 11, 2010), pp. 1-7, XP055060342, Retrieved from the Internet: URL:http://phenix.int-evry.fr/jct/index.php (retrieved on Apr. 19, 2013] *the whole document*.

Jungsun Kim et al.: "New Intra Chroma Prediction Using Inter Channel Correlation", 2. JCT-VC Meeting; Jul. 21, 2010- Jul. 28, 2010; Geneva; (Joint Collaborativeteam on Video Coding of ISO/IEC JTC1/SC29/WG11 and ITU-TSG.16); URL:http://wftp3.itu.int/av-arch/jctvc-site/, No. JCTVC-BO21, Jul. 23, 2010 (Jul. 23, 2010), XP030007601, ISSN: 00000048 *pp. 1-3*.

Edouard Francois et al.: "Non-CE6a: Use of chroma phase in LM mode", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://wfrp3.itu.int/av-arch/jctvc-site/ No. JCTVC-G245, Nov. 8, 2011 (Nov. 8, 2011), XP030110229, *pp. 1-4*.

Ik-Hwan Cho et al.: "New Intra Luma Prediction Mode in H.264/AVC Using Collocated Weighted Chroma Pixel Value", Jan. 1, 2006 (Jan. 1, 2006), Advanced Concepts for Intelligent Vision Systems Lecture Notes in Computer Science;;LNCS, Springer, Berlin, DE, pp. 344353, XP019043355, ISBN:978-3-540-44630-9 *pp. 14, 8-9*.

Sang Heon Lee et al.: "Intra prediction method based on the linear relationship between the channels for YUV 4:2:0 intra coding", Image Processing (ICIP), 2009 16th IEEE International Conference on IEEE, Piscataway, NJ, USA, Nov. 7, 2009 (Nov. 7, 2009), pp. 1037-1040, XP031628426, DOI:10.1109/ICIP.2009.5413727 ISBN:978-1-4244-5653-6 *the whole document*.

Iain E G Richardson: "Prediction of Inter Macroblocks in P-slices", internet Citation, Apr. 30, 2003 (Apr. 30, 2003), pp. 1-3, XP002596717, Retrieved form the Internet: URL:http://www.vcodex.com/files/h264_interpred.pdf [retrieved on Aug. 17, 2010] *the whole document*.

Charles Poynton Ed-Poyntion C: "Digital Video and HDTV", Jan. 1, 2003 (Jan. 1, 2003), Digital Video and HDTV: Algorithms and Interfaces, Morgan Kaufmann, pp. 90-93.333, XP002450116, ISBN:978-1-55860-792-7 *p. 93*.

European Search Report dated Jan. 29, 2015, for Application No. 11003021, 16 pages.

Chinese Office Action dated May 19, 2015 for Chinese Application No. 2011-80018316, with English Translation, 13 pages.

Dong L, et al.: "Improved Chroma Intra Mode Signaling", 95. MPEG Meeting; Jan. 24, 2011-Jan. 28, 2011; Daegu; (Motion

(56) References Cited

OTHER PUBLICATIONS

Picture Expert Group or ISO/IEC JTC1/SC29/WG11), No. m19019, Jan. 22, 2011 {Jan. 22, 2011), XP030047587, *abstract*, *p. 2*.
Chen J., et al. "CE6_a.4: Chroma intra prediction by reconstructed luma samples", Mar. 12, 2011, No. JCTVC-E266, Mar. 12, 2011 (Mar. 12, 2011), XP030008772, ISSN: 0000-0007, *pp. 3, 10*.
Korean Notice of Allowance in Korean Application No. 10-2012-7029158, dated Jul. 17, 2017, 3 pages (with English translation).
Chinese Office Action issued in Chinese Application No. 201511009169.4, dated Dec. 25, 2017, 12 pages (with English translation).
Chinese Office Action in Chinese Application No. 2015110110036.9. dated Feb. 8, 2018, 9 pages.
Chinese Office Action in Chinese Application No. 201511018935.3, dated Jul. 6, 2018, 10 pages.

X Location of luma sample
O Location of chroma sample

4:2:0 sampling

FIG. 11A

| intraPredMode | Name of intraPredMode |
|---|---|
| 0 | Intra_Vertical |
| 1 | Intra_Horizontal |
| 2 | Intra_DC |
| Otherwise (3..33) | Intra_Angular |

FIG. 11B

| intraPredMode | Name of intraPredMode |
|---|---|
| 0 | Intra_Vertical |
| 1 | Intra_Horizontal |
| 2 | Intra_DC |
| Otherwise (3..33) | Intra_Angular |
| 34 | Intra_LM |

FIG. 14A

| intra_chroma_pred_mode | IntraPredMode[ xB ][ yB ] | | | |
|---|---|---|---|---|
| | 0 | 1 | 2 | X ( 3 <= X < 34 ) |
| 0 (LM) | 34 | 34 | 34 | 34 |
| 1 (Vertical) | n/a | 0 | 0 | 0 |
| 2 (Horizontal) | 1 | n/a | 1 | 1 |
| 3 (DC) | 2 | 2 | n/a | 2 |
| 4 (DM: same as luma) | 0 | 1 | 2 | X |

FIG. 14B

| intra_chroma_pred_mode | IntraPredMode[ xB ][ yB ] | | | |
|---|---|---|---|---|
| | 0 | 1 | 2 | X ( 3 <= X < 34 ) |
| 0 (LM) | 10 | 10 | 10 | 10 |
| 1 (Vertical) | n/a | 111 | 111 | 110 |
| 2 (Horizontal) | 111 | n/a | 110 | 1111 |
| 3 (DC) | 110 | 110 | n/a | 1110 |
| 4 (DM: same as luma) | 0 | 0 | 0 | 0 |

FIG. 15

| Intra chroma prediction mode | Mode number | Codewords |
|---|---|---|
| DM | 4 | 0 |
| LM | 0 | 10 |
| Ver | 1 | 110 |
| Hor | 2 | 1111 |
| DC | 3 | 1110 |

FIG. 20

| coding_unit( x0, y0, log2CUSize ) { | Descriptor |
|---|---|
| ... | |
|   if( skip_flag[ x0 ][ y0 ] ) | |
|     prediction_unit( x0, y0, log2CUSize, log2CUSize, 0 , 0 ) | |
|     transform_tree( x0, y0, log2CUSize, 0, 0 ) | |
|   else { | |
| ... | |
|     if( slice_type != I \|\| log2CUSize == Log2MinCUSize ) | |
|     pred_type | u(v) \| ae(v) |
|     transform_tree( x0, y0, log2CUSize, 0, 0 ) | |
| ... | |
|   if( PartMode == PART_2Nx2N ) { | |
|     prediction_unit( x0, y0, log2CUSize, log2CUSize, 0 , 0 ) | |
|   } else if( PartMode == PART_2NxN ) { | |
| prediction_unit( x0, y0, log2CUSize, log2CUSize – 1, 0 , log2CUSize > Log2MinCUSize ) | |
|     prediction_unit( x0, y1, log2CUSize, log2CUSize – 1, 1 , 0 ) | |
|   } else if( PartMode == PART_Nx2N ) { | |
|     prediction_unit( x0, y0, log2CUSize - 1, log2CUSize, 0 , log2CUSize > Log2MinCUSize ) | |
|     prediction_unit( x1, y0, log2CUSize - 1, log2CUSize, 1 , 0 ) | |
|   } else { /* PART_NxN */ | |
|     prediction_unit( x0, y0, log2CUSize – 1, log2CUSize – 1, 0 , 0 ) | |
|     prediction_unit( x1, y0, log2CUSize – 1, log2CUSize – 1, 1 , 0 ) | |
|     prediction_unit( x0, y1, log2CUSize – 1, log2CUSize – 1, 2 , 0 ) | |
|     prediction_unit( x1, y1, log2CUSize – 1, log2CUSize – 1, 3 , 0 ) | |
|   } | |
| } | |
|   transform_coeff( x0, y0, log2CUSize, 0, 0 ) | |
|   transform_coeff( x0, y0, log2CUSize, 0, 1 ) | |
|   transform_coeff( x0, y0, log2CUSize, 0, 2 ) | |
| } | |

FIG. 21

| prediction_unit() { | |
| --- | --- |
| ... | |
| if(PredMode==MODE_INTRA) { | |
| prev_intra_luma_pred_flag[ x0 ][ y0 ] | u(1) \| ae(v) |
| if( !prev_intra_luma_pred_flag[ x0 ][ y0 ] ) | |
| rem_intra_luma_pred_mode[ x0 ][ y0 ] | ue(v) \| ae(v) |
| intra_chroma_pred_mode[ x0 ][ y0 ] | ue(v) \| ae(v) |
| } | |
| ... | |
| } | |

| transform_tree() { | |
| --- | --- |
| ... | |
| if( log2TrafoSize <= Log2MaxTrafoSize && log2TrafoSize > Log2MinTrafoSize && trafoDepth < maxDepth && !intraSplitFlag ) | |
| split_transform_flag[ x0 ][ y0 ][ trafoDepth ] | u(1) \| ae(v) |
| ... | |
| if( split_transform_flag[ x0 ][ y0 ][ trafoDepth ] ) { | |
| x1 = x0 + ( ( 1 << log2TrafoSize ) >> 1 ) | |
| y1 = y0 + ( ( 1 << log2TrafoSize ) >> 1 ) | |
| transform_tree( x0, y0, log2TrafoSize − 1, trafoDepth + 1, 0 ) | |
| transform_tree( x1, y0, log2TrafoSize − 1, trafoDepth + 1, 1 ) | |
| transform_tree( x0, y1, log2TrafoSize − 1, trafoDepth + 1, 2 ) | |
| transform_tree( x1, y1, log2TrafoSize − 1, trafoDepth + 1, 3 ) | |
| } | |
| ... | |
| } | |

METHOD AND APPARATUS FOR PROCESSING VIDEO DATA

CROSS-REFERENCE TO RELATED APPLICATIONS

This application is a continuation of U.S. application Ser. No. 15/915,211, filed on Mar. 8, 2018, now allowed, which is a continuation of U.S. application Ser. No. 15/212,390, filed Jul. 18, 2016, now U.S. Pat. No. 9,918,106, which is a continuation of U.S. application Ser. No. 14/478,586, filed Sep. 5, 2014, now U.S. Pat. No. 9,426,472, which is a continuation of U.S. application Ser. No. 13/083,896, filed Apr. 11, 2011, now U.S. Pat. No. 8,861,594, which claims the benefit of U.S. Provisional Patent Application No. 61/322,292 filed on Apr. 9, 2010; U.S. Provisional Patent Application No. 61/322,293 filed on Apr. 9, 2010; U.S. Provisional Patent Application No. 61/453,955 filed on Mar. 17, 2011; U.S. Provisional Patent Application No. 61/453,981 filed on Mar. 18, 2011; U.S. Provisional Patent Application No. 61/454,565 filed on Mar. 20, 2011; and U.S. Provisional Patent Application No. 61/454,586 filed on Mar. 21, 2011, all of which are hereby incorporated by reference as if fully set forth herein.

BACKGROUND OF THE INVENTION

Field of the Invention

The present invention relates to a method and apparatus for performing intra prediction mode decoding on digital video data that has been encoded using an intra prediction mode. The present invention also relates to a method and apparatus for signaling the proper intra prediction mode to a decoding unit.

Discussion of the Related Art

Generally, there are two methods for accomplishing video compression encoding in order to eliminate temporal and spatial redundancy. Eliminating temporal and spatial redundancy is an important requirement to increase a compression ratio of a video signal in order to decrease an overall size of a video data transmission.

An inter prediction encoding method is able to predict a current video data block based on similar regions found on a previously encoded picture that temporally precedes a current picture that includes the current video data block. And an intra prediction encoding method is able to predict a current video data block based on previously encoded blocks that are adjacent to the current video data block and within a same picture. The inter prediction method is referred to as a temporal prediction method, and the intra prediction method is referred to as a spatial prediction method.

Video data comprised of inter predicted and intra predicted video data pictures are transmitted to a receiver and then decoded to reproduce the video data. A decoding unit must perform the proper prediction mode processing in order to reconstruct the received video data.

Pertaining to the intra prediction method of encoding, there exists various modes for accomplishing the spatial prediction that defines the intra prediction method. And within both the inter and intra prediction methods, the prediction for a luminance (luma) sample is handled separately from a prediction of a chrominance (chroma) sample. Luminance can be defined as the brightness of an image, and chrominance can be defined as a representation of color difference within an image. Although both luma and chroma are important components in any picture image, due to the human visual system being more sensitive to variances in luminance as compared to variances in chrominance, prediction modes have generally been more concerned with luma prediction modes compared to chroma prediction modes.

Accordingly, none of the currently recognized chroma prediction modes contemplate reconstructing a chroma sample by utilizing a linear combination of interpolated luma samples. By taking advantage of the interpolation of luma samples, where the luma samples have been previously reconstructed, a new mode for efficiently predicting the chroma sample can be achieved.

There also exists a need to conserve a number of codeword bits when transmitting binary codewords related to information transmitted along with video data as part of the overall video data signal. When transmitting large amounts of video data, it becomes even more important to conserve the number of codeword bits that are transmitted along with the video data in order to conserve the number of overall bits being transmitted. This allows for a more efficient compression of the video data signal as a whole.

SUMMARY OF THE INVENTION

It is an object of the present invention to introduce a method and apparatus for prediction processing an intra chroma sample that is able to reconstruct a chroma sample by using a linear combination of previously reconstructed luma samples that have been interpolated.

It is also an object of the present invention to provide a more efficient method and apparatus for signaling and identifying a proper current prediction mode by relying on prediction mode information previously identified. By relying on previously identified prediction mode information to determine a proper current prediction mode, a reduction in overall codeword bits that need to be transmitted by an encoding unit may be accomplished.

The present invention provides a new model for performing chroma prediction on a current chroma sample that is based on a linear combination of previously reconstructed luma samples that have been interpolated. This new model for performing chroma prediction also utilizes previously reconstructed luma samples that have been interpolated and previously reconstructed chroma samples, where these samples are taken from blocks that neighbor the current chroma sample. By utilizing a linear combination of previously reconstructed luma samples from the same block as the current chroma sample, previously reconstructed luma samples that have been interpolated and are from a block neighboring the current chroma sample, and previously reconstructed chroma samples that are from a block neighboring the current chroma sample, a higher prediction accuracy for the chroma sample can be achieved.

The present invention also accomplishes a reduction in overall codeword bits that need to be transmitted, thus reducing an overall transmission of bits in a bitstream. This is accomplished by making information transmitted later in time dependent on information transmitted prior in time when possible.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 11A is a table of available luma prediction modes according to a preferred embodiment of the present invention;

FIG. 11B is a table of available luma prediction modes according to another embodiment of the present invention;

FIG. 14A is a table mapping the relationship between luma prediction mode information and chroma prediction mode information;

FIG. 14B is a binary codeword representation of the table in FIG. 14;

FIG. 15 is a table comparing the numerical value for intra chroma prediction modes against their binary bit codeword value;

FIG. 20 illustrates a method for transmitting transform unit size information according to the present invention;

FIG. 21 illustrates a method for transmitting transform unit size information according to the present invention.

DETAILED DESCRIPTION OF THE INVENTION

Figure 1:
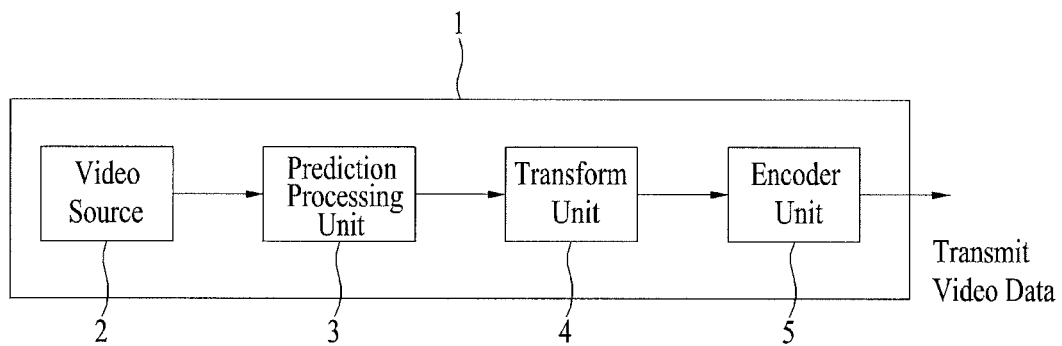
FIG. 1 is a block diagram of an encoding unit according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for decoding digital video data includes receiving a sequence of pictures that comprise the video data, each picture of video data being comprised of at least one slice, and each slice being comprised of at least one treeblock. Each treeblock being partitioned into a number of prediction units, and performing a prediction on each prediction unit according to a corresponding prediction mode in order to reconstruct the video data. The corresponding prediction mode should be the same prediction mode used for encoding the prediction unit prior to transmission.

According to the present invention, prediction mode type information is received along with the video data for identifying a prediction mode of each prediction unit of the video data. The prediction mode type information distinguishes between inter prediction modes and intra prediction modes. The prediction mode type information also distinguishes between prediction modes corresponding to luma prediction units and prediction modes corresponding to chroma prediction units.

According to the present invention, when the prediction mode type information indicates that a linear method (LM) prediction mode is to be implemented to intra predict a current chroma prediction unit for reconstruction, the LM prediction mode includes obtaining a linear combination of previously reconstructed luma samples that have been interpolated from within a same block of the current chroma prediction unit. The LM mode further includes obtaining a linear interpolation of previously reconstructed luma samples from blocks neighboring the current chroma prediction unit, and obtaining previously reconstructed chroma samples from blocks neighboring the current chroma prediction unit.

Also according to the present invention, when the prediction mode type information indicates that a linear method prediction mode is to be made for inter predicting a current chroma prediction unit, a method is provided for obtaining a linear combination of previously reconstructed luma samples that have been interpolated, where the luma samples are obtained from reference pictures that are different from a current picture including the current chroma prediction unit. For the inter prediction method of the LM prediction mode, utilized reconstructed chroma samples may be obtained from luma samples that have been reconstructed from reference pictures that are different from the current picture or luma samples that are previously reconstructed on the current picture. Also, reconstructed chroma samples may be directed obtained from a reference picture of the inter prediction mode of the LM prediction mode for inter prediction. The inter prediction method for the linear method prediction mode is also applicable for B-picture references that are reconstructed at a future time.

The LM prediction mode of the present invention also applies to cases where a prediction unit may be partitioned into both intra prediction partition blocks and inter prediction partition blocks.

According to the present invention, the LM prediction mode identifying a prediction process for a chroma sample may be signaled in a manner that relies on a previously signaled prediction mode relating to a luma sample. This is done in order to conserve the amount of binary codeword bits needed to identify a proper prediction mode.

It is to be understood that both the foregoing general description and the following detailed description are exemplary and explanatory and are intended to provide further explanation of the invention as claimed.

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in an intended way. The embodiments disclosed in this disclosure and configurations shown in the accompanying drawings are exemplary in nature and are not intended to be inclusive in nature. The preferred embodiments do not represent all possible technical variations of the present invention. Therefore, it is understood that the present invention covers the modifications and variations of this invention provided they come within the scope of the appended claims and their equivalents at the timing point of filing this application.

For instance a picture may be referred to as a frame, where a frame or picture represents a single instance of video data. A sequence of pictures, or frames, comprise the video data. A picture is generally comprised of a plurality of slices, but it is possible for a single slice to comprise an entire picture. Also a block can also be referred to as a unit.

Each slice is generally partitioned into a plurality of treeblocks. The size of a treeblock is variable, and may have a size as large as 64×64 pixels. Alternatively, a treeblock may have a size corresponding to any one of 32×32, 16×16, 16×8, 8×16, 8×8, 8×4, 4×8, 4×4, 4×2, 2×4 and 2×2 pixels. The size of a treeblock is influenced by a variety of factors such as, but not limited to, a chosen video resolution of a video picture. An encoder may also adaptively determine an optimal size for a treeblock throughout the sequence of pictures that comprise the video data. Another basic unit for processing a video picture is a macroblock. A macroblock has a size of 16×16.

Prior to decoding a transmission of video data, the video data must first be encoded. FIG. 1 illustrates that video data originates from a video source that provides original video data. Although FIG. 1 depicts the video source to be part of an overall transmission unit 1, the video source 2 may be detached from the transmission unit 1 as long as the video source 2 is able to communicate the original video data to the transmission unit 1. In the case where the video source is not an integral part of the transmission unit 1, it is possible for the video source 2 to be in direct physical communication with the transmission unit 1, or in wireless communication with the transmission unit 1.

Prediction processing is performed by a prediction processing unit 3 of the transmission unit 1. Prediction processing of the original video data is necessary to attain a sequence of video data pictures that represents the original video data from the video source. It is while the video data is undergoing various prediction processing in the prediction processing unit 3 that prediction mode information is associated to each prediction unit of video data. The prediction mode information identifies under which available prediction mode each prediction unit was prediction processed. This way, later upon reception of the video data at a decoding unit, each prediction unit can be successfully re-predicted and reconstructed for display by undergoing the same prediction mode processing as identified by the prediction mode information. After going through the prediction processing, a transform unit 4 performs a transform operation on the predicted video data. It is most likely a Discrete Cosine Transform (DCT) is performed on the predicted video data. Then the video data is encoded by the encoder unit 5 and transmitted.

Figure 2:
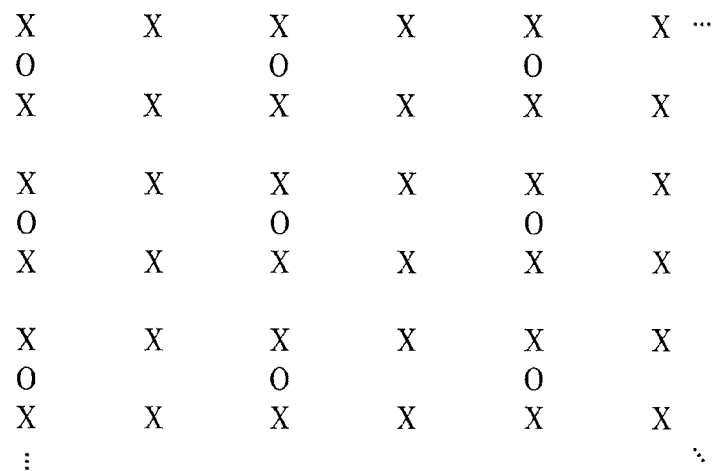
FIG. 2 is an illustrative view of encoded video data.

FIG. 2 depicts a representation of a video data picture according to the present invention. The picture in FIG. 2 corresponds to a 4:2:0 sampling rate of the video data. The 4:2:0 sampling rate ensures that for every 2×2 luma sample treeblock including 4 luma samples (Y or L), there is a pair of corresponding chroma samples (Cr,Cb). In addition to the 4:2:0 sampling rate illustrated by FIG. 2, there are various other sampling rates available to transmit the video data. Such other sampling rates include, but are not limited to, a 4:2:2 sampling rate and a 4:4:4 sampling rate. While the disclosure for the present invention will be made under the assumption of a 4:2:0 sampling rate, it is understood that all aspects of the present invention are applicable under all available sampling rates.

Figure 3:
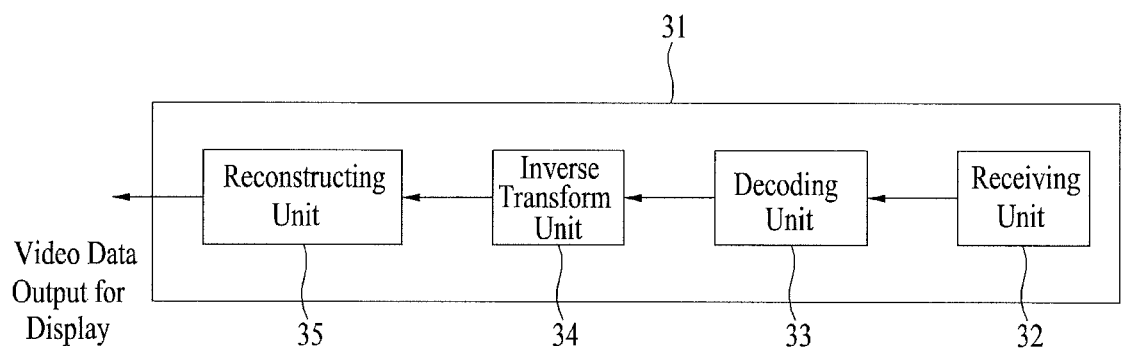
FIG. 3 is a block diagram of a decoding unit according to the present invention.

FIG. 3 illustrates a receiver 31 receiving the video data that was transmitted from the transmitting unit in FIG. 1. The receiver receives the video data in a receiving unit 32 along with the corresponding prediction mode information. The decoding unit 33 then decodes the video data. It is during the decoding of the video data that the corresponding prediction mode information is read to identify the proper prediction mode process to perform for each prediction unit received as part of the video data. The inverse transform unit 34 then performs an inverse transform operation on the video data. Most likely it will be an inverse Discrete Cosine Transform. And the reconstructing unit 35 performs a reconstruction of the prediction units that have been processed according to the corresponding prediction mode to re-create the video data for display.

Chroma Intra-Prediction Modes

First, intra prediction modes for predicting chroma samples will be explained.

A receiver's decoding unit that receives actual video data will also receive intra chroma prediction mode information that corresponds to each chroma prediction unit of the video data. The chroma sample that requires prediction processing at a decoding unit can be referred to as the chroma prediction unit. The intra chroma prediction mode information indicates the prediction mode used by an encoder to encode video data prior to transmission of the video data. This is required so that at the receiving decoding unit side, the corresponding prediction mode may be processed on a prediction unit of video data in order to ensure successful reproduction of the video data. Thus upon receiving the transmission of video data, the decoding unit is then tasked with reading the intra chroma prediction mode information and then performing the appropriate prediction on the prediction unit according to the value indicated by the intra chroma prediction mode information.

TABLE 1

| intra_chroma_pred_mode | Name of intra_chroma pred_mode |
|---|---|
| 0 | intra_Chroma_Estimation (prediction mode) |
| 1 | intra_Chroma_DC (prediction mode) |
| 2 | intra_Chroma_Horizontal (prediction mode) |
| 3 | intra_Chroma_Vertical (prediction mode) |
| 4 | intra_Chroma_Plane (prediction mode) |

Table 1 depicts one embodiment of the values and names for the various intra chroma prediction modes according to one embodiment of the present invention. By applying one of these intra chroma prediction modes, a current chroma prediction unit can be accurately predicted and reconstructed by a decoding unit.

Figure 4A:
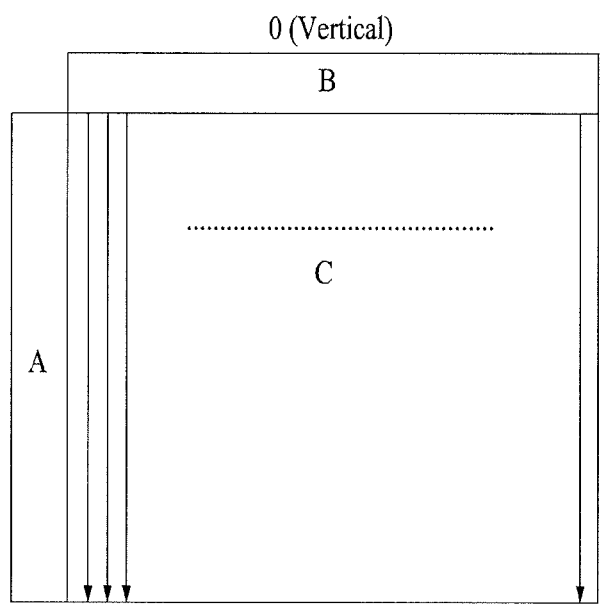
FIGS. 4A to 4D illustrate available intra prediction modes according to some embodiments of the present invention.
Figure 4B:
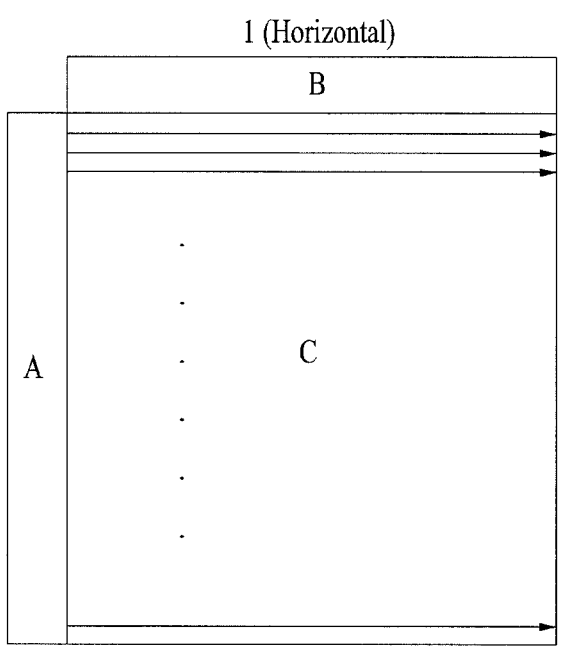
Figure 4C:
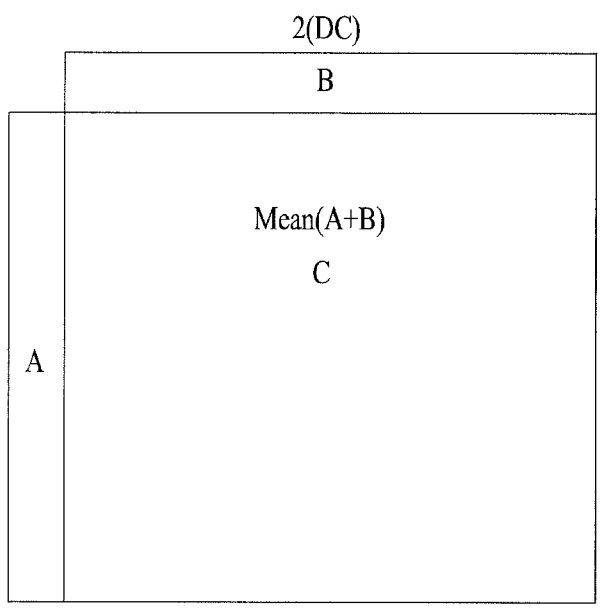

Table 1 specifically lists a series of values that correspond to a specific intra chroma prediction mode. Therefore, the intra chroma prediction mode information will include at least a value that identifies the corresponding intra chroma prediction mode. When intra chroma prediction mode information has a value of '1', a DC mode for prediction will be applied to a current chroma prediction unit. For a DC prediction mode, previously reconstructed blocks to the left and top of a current prediction unit, commonly referred to as neighboring blocks, will be utilized to process the prediction of the current prediction unit. FIG. 4C depicts an illustrative example for a DC prediction mode. C represents a current prediction unit, A represents previously reconstructed blocks to the left of the current prediction unit C, and B represents previously predicted block to the top of the current prediction unit C. According to the DC prediction mode, the mean of previously reconstructed blocks A and B are taken to process the prediction for the current prediction unit C when they are both available. However if only blocks A are available, then the prediction processing may follow the horizontal mode explained below. Or if only blocks B are available, then the prediction processing may follow the vertical prediction mode explained below. A block is considered to be unavailable when it has not yet been reconstructed or when it is not from within a same slice as the current prediction unit.

When intra chroma prediction mode information has a value of '2', a horizontal mode for prediction will be applied to a current chroma prediction unit. For a horizontal prediction mode, a previously reconstructed neighboring block to the left of the current prediction unit will be utilized to process the prediction of the current prediction unit. FIG. 4B depicts an illustrative example for a horizontal mode prediction. According to the horizontal mode prediction, previously reconstructed blocks A will be used to process a prediction of current prediction unit C.

When intra chroma prediction mode information has a value of '3', a vertical prediction mode will be applied to a current chroma prediction unit. For a vertical prediction mode, previously reconstructed neighboring blocks to the top of the current prediction unit will be utilized to process the prediction of the current prediction unit. FIG. 4A depicts an illustrative example for a vertical mode prediction. According to the vertical mode prediction, previously reconstructed blocks B will be used to process a prediction of current prediction unit C.

Figure 4D:
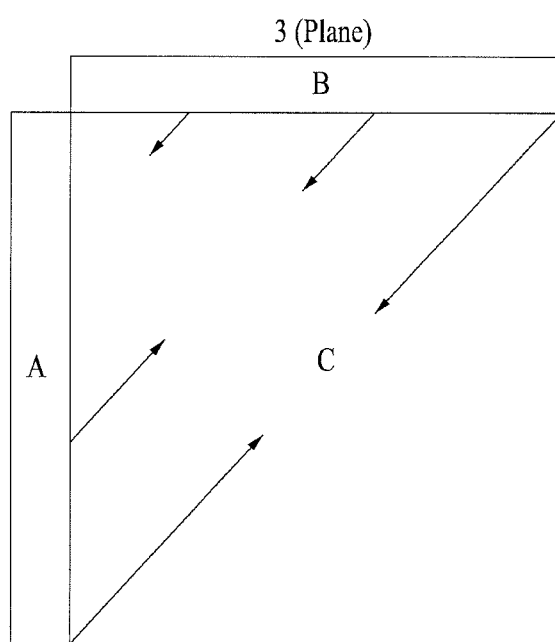

When intra chroma prediction mode information has a value of '4', a plane mode for prediction will be applied to a current chroma prediction unit. FIG. 4D depicts an illustrative example for a plane mode prediction. Both previously reconstructed blocks to the left and to the top, A and B respectively, of the current prediction unit C will be utilized to process a prediction of the current prediction unit C according to the plane mode.

The explanation for the Estimation prediction mode corresponding to when the intra chroma prediction mode information has a value of '0' will be explained in detail later in the disclosure. For future reference, the Estimation mode is considered to be the same as the LM mode prediction mode described in Table 2 below.

TABLE 2

| intra_chroma_pred_mode | Name of intra_chroma_pred_mode |
|---|---|
| 0 | intra_Chroma_LM (prediction mode) |
| 1 | intra_Chroma_Vertical (prediction mode) |
| 2 | intra_Chroma_Horizontal (prediction mode) |
| 3 | intra_Chroma_DC (prediction mode) |
| 4 | intra_Chroma_DM (prediction mode) |

Table 2 depicts a second embodiment for identifying intra prediction modes to be applied to chroma prediction units according to the present invention. Table 2 is considered the preferred embodiment for intra chroma prediction modes for the present invention.

When intra chroma prediction mode information has a value of '1', a vertical prediction mode will be applied to a current chroma prediction unit. The vertical prediction mode described in Table 2 operates in the same manner as the vertical prediction mode described in Table 1 above.

When intra chroma prediction mode information has a value of '2', a horizontal prediction mode will be applied to a current chroma prediction unit. The horizontal prediction mode described in Table 2 operates in the same manner as the horizontal prediction mode described in Table 1 above.

When intra chroma prediction mode information has a value of '3', a DC prediction mode will be applied to a current chroma prediction unit. The DC prediction mode described in Table 2 operates in the same manner as the DC prediction mode described in Table 1 above.

In addition, although not specifically identified in Table 2, an intra angular prediction mode is available for processing a prediction of a current chroma prediction unit. The description for the intra angular prediction mode is described below in reference to intra luma prediction modes. The intra angular prediction mode available for processing chroma prediction units operates in the same manner as the intra luma prediction mode. Including all of the angular prediction modes, there are thirty four (34) available intra chroma prediction modes according to the preferred embodiment of the invention.

When intra chroma prediction mode information has a value of '4', an intra DM prediction mode will be applied to a current chroma prediction unit. The DM prediction mode is not available in Table 1. The DM prediction mode processes a prediction on a current chroma prediction unit according to a prediction mode applied to a luma sample found in the same prediction unit as the current chroma prediction unit.

So the intra luma prediction mode information is transmitted and received by a decoding mode prior to the intra chroma prediction mode information. Thus according to the DM prediction mode, the value corresponding to the intra chroma DM prediction mode will simply indicate a decoding unit to prediction process the current chroma prediction unit in the same mode identified by the intra luma prediction mode information corresponding to luma samples of the same prediction unit. Available intra prediction modes for a luma prediction unit can be found in FIG. 11A described later in the disclosure.

When intra chroma prediction mode information has a value of '0', an LM (Linear Method) prediction mode will be applied to a current chroma prediction unit. As mentioned above, the LM prediction mode and Estimation prediction mode are to be understood to operate in the same manner, and may be referenced according to either name throughout the disclosure.

Intra LM Prediction Mode

Figure 5:
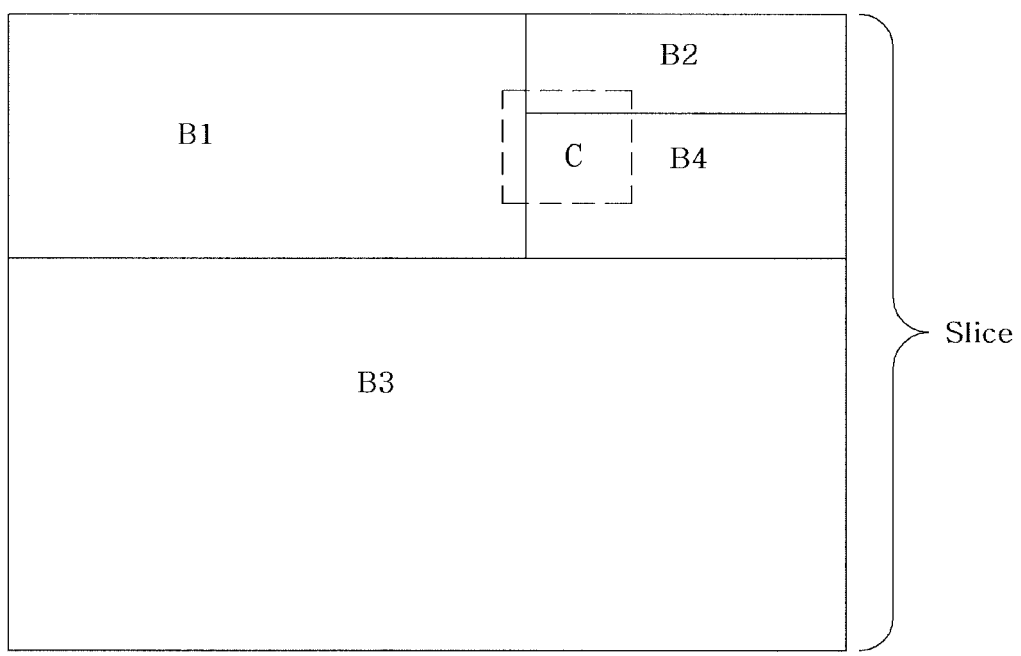
FIG. 5 illustrates a video data picture partitioned into slice units.

A detailed description for the intra LM chroma prediction mode will now be given. When receiving a video data transmission, a decoder will first predict and reconstruct (ie. decode), luma prediction units of a given block prior to predicting and reconstructing chroma prediction units of the same block. FIG. 5 illustrates a slice according to the present invention that is partitioned into 4 blocks. Assuming that blocks B1, B2 and B3 have already been prediction processed and reconstructed by a decoding unit of a receiver, it is taken that B4 is currently being prediction processed for reconstruction. And within block B4, the upper lefthand corner of block B4 will be taken for exemplary purposes to embody a current block C currently being prediction processed.

Figure 6:
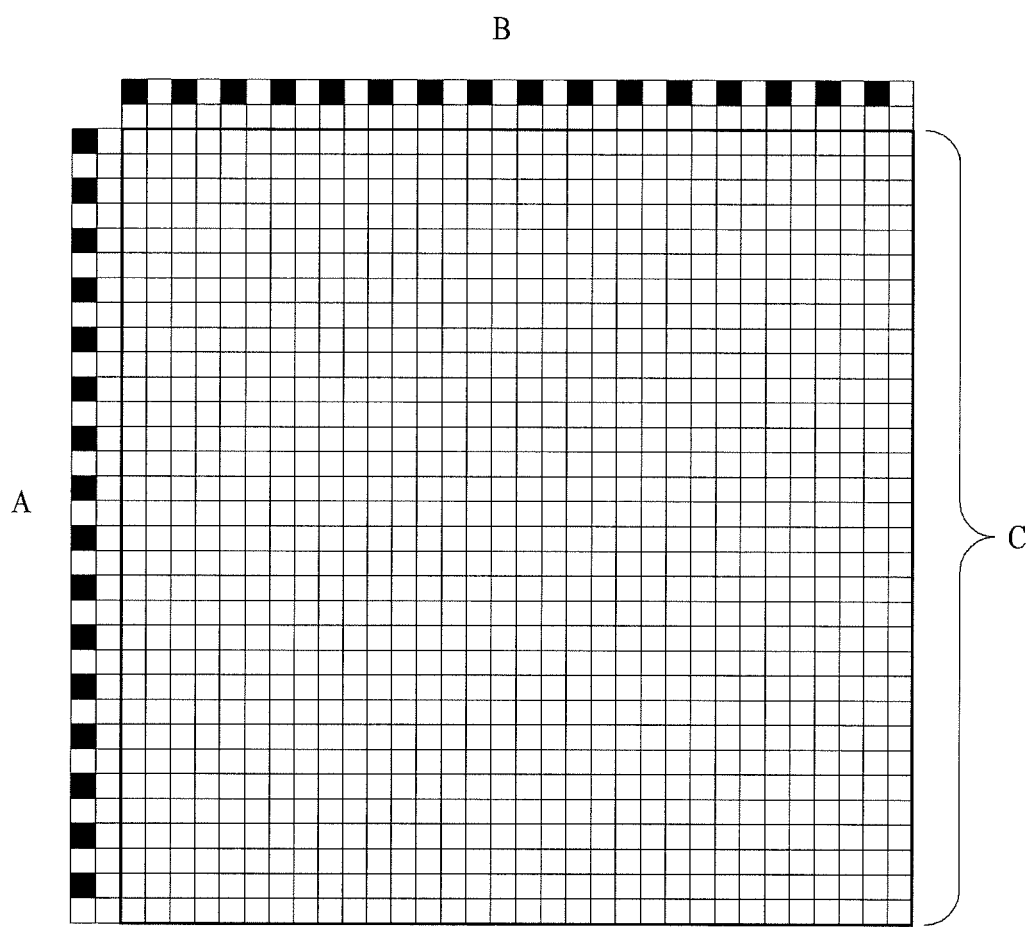
FIG. 6 is a close up view of an area specified from FIG. 5.

FIG. 6 is then a magnified view of the box area outlined in dashed lines in FIG. 5. FIG. 6 illustrates a 32×32 size depiction of block C that is currently being prediction processed. Each of the white blocks outlined in block C represents a luma sample that has already been prediction processed and reconstructed. Therefore only the chroma samples of the block C need to be prediction processed. Adjacent to block C are neighboring blocks A and block B. Block A is a partial representation of B1 located to the left of block C, as seen in FIG. 5. And block B is a partial representation of B2 located to the top of block C, as seen in FIG. 5. Both block A and block B have already been reconstructed.

Figure 7:
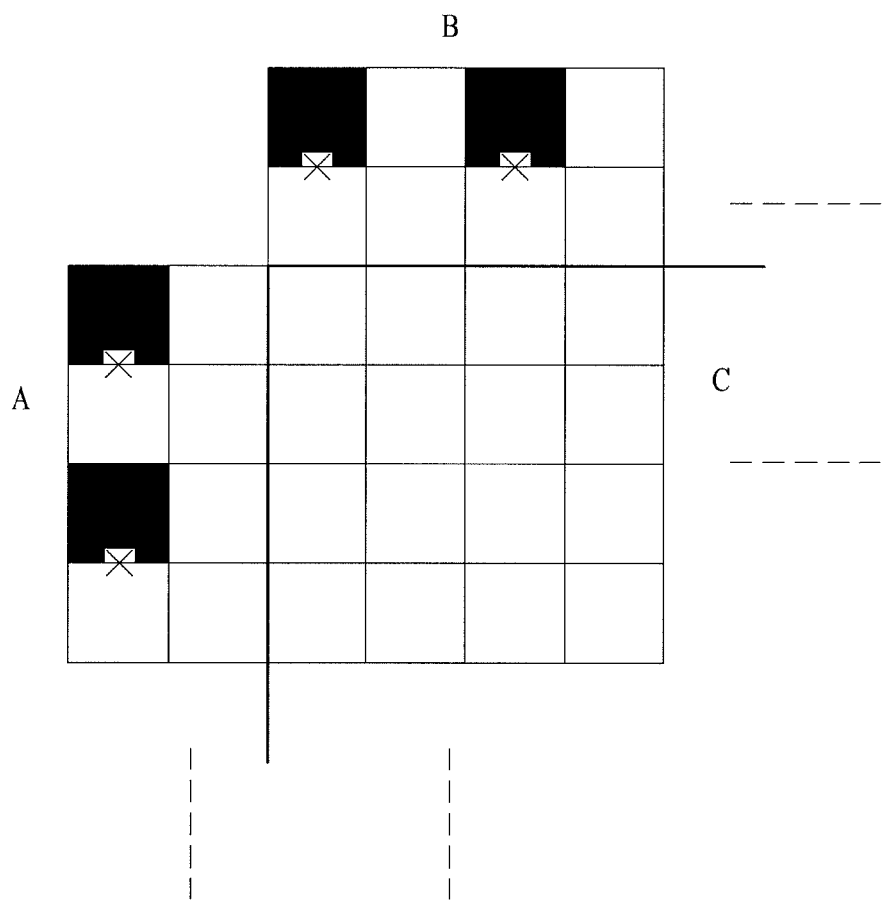
FIG. 7 is a close up view of an area specified from FIG. 6.

FIG. 7 illustrates a further close up view of a 4×4 size block from the upper lefthand portion of the current prediction block C seen in FIG. 6. FIG. 7 also provides a 2×4 size partial block view of the adjacent block A to the left of block C. And FIG. 7 also provides a 4×2 size block partial block view of the adjacent block B to the top of block C. Because blocks A and B have already been reconstructed, the white blocks of blocks A and B represent luma samples that have already been reconstructed, and the black squares represent sets of chroma samples that have already been reconstructed. It is noted that although not visible due to the black reconstructed chroma blocks, there is also a corresponding reconstructed luma sample behind each black chroma sample in blocks A and B. Therefore, the luma samples of the current block C have already been reconstructed, the luma samples of the neighboring blocks A and B have already been reconstructed, and the chroma samples of the neighboring blocks A and B have already been reconstructed. And the 'X' marks in blocks A and B represent a linear interpolation of reconstructed luma samples from each corresponding blocks A and B. These reconstructed luma and chroma samples from neighboring blocks, and linear interpolation of luma samples from neighboring blocks, will all play a role in the LM prediction mode processing for chroma prediction units of the current block C.

In order to perform an intra chroma prediction for a current chroma prediction unit in block C according to an LM mode, a linear interpolation of previously reconstructed luma samples within the current prediction block C must first be attained.

According to a preferred embodiment of the intra LM prediction mode, two previously reconstructed luma samples are obtained from within block C. A previously reconstructed luma sample is denoted by $P_L(x,y)$, where x and y correspond to location references for a current chroma prediction unit within block C that is currently being prediction processed according to the LM prediction mode. A first luma sample is taken at $P_L(2x,2y)$ and a second luma sample is taken at $P_L(2x,2y+1)$ within block C. Then according to the preferred embodiment of the intra LM prediction mode, the linear combination of interpolated luma samples, $P_{L*}(x,y)$, can be attained by $$P_{L*}(x,y)=0.5*[P_L(2x,2y)+P_L(2x,2y+1)] \quad \text{[Math Figure 1]}$$

Now with the attained linear combination of interpolated luma samples, $P_{L*}(x,y)$, the intra LM prediction for the current chroma prediction unit, denoted by $P'_c$, can be attained by $$P'_c=\alpha*0.5*P_{L*}+\beta \quad \text{[Math Figure 2]}$$

where alpha, α, and beta, β, can be attained by $$\alpha = \frac{R(\hat{P}_{L*}, \hat{P}_C)}{R(\hat{P}_{L*}, \hat{P}_{L*})} \quad \text{[Math FIG. 3]}$$

$$\beta = M(\hat{P}_C) - \alpha \times M(\hat{P}_{L*})$$

According to Math Figure 3, R(*,*) represents a correlation between the two references variables, and M(*) represents an average for the variable referenced within. $\hat{P}_{L*}$ represents a linear interpolation of a previously reconstructed luma sample taken from either one of neighboring blocks A or B. According to FIG. 7, $\hat{P}_{L*}$ is represented by the 'X' marks found in either of neighboring blocks A or B. And $\hat{P}_C$ represents a reconstructed chroma sample taken from either one of neighboring blocks A or B. According to FIG. 7, $\hat{P}_C$ is represented by the black blocks in either one of neighboring blocks A or B. $\hat{P}_{L*}$ may also implement a left or right shift function to account for any rounding errors that may occur.

Figure 8:
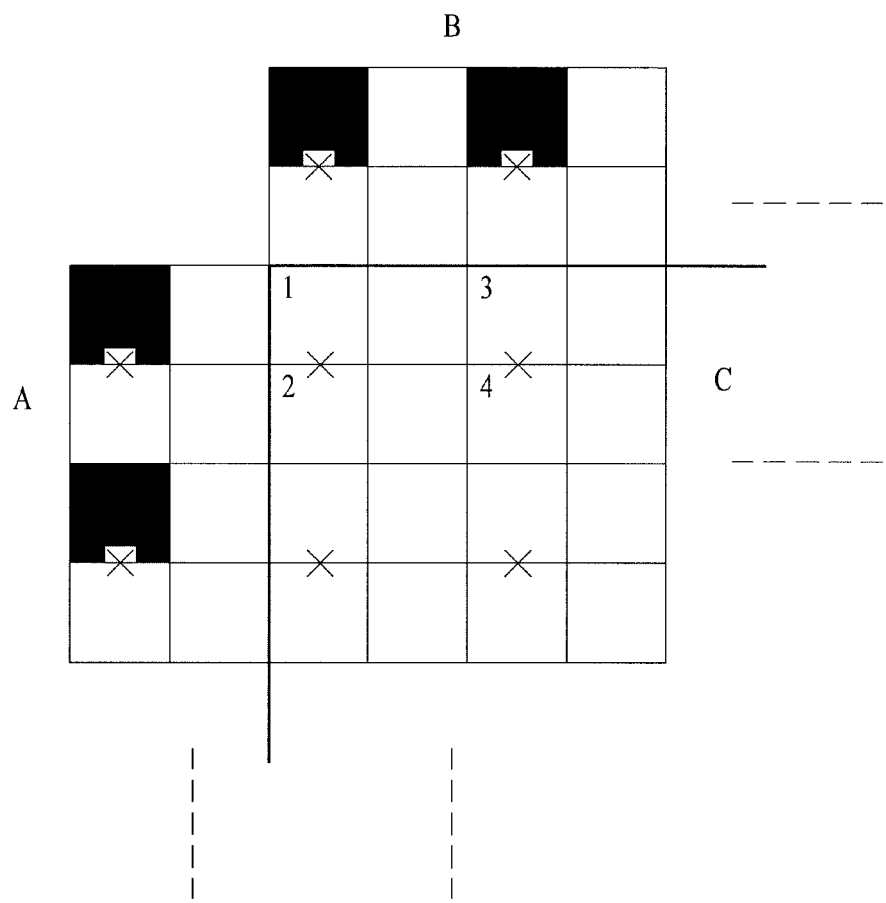
FIG. 8 illustrates the result of an interpolation process according to a preferred embodiment of the present invention.

FIG. 8 is the same close up view of the upper lefthand portion of block C as seen in FIG. 7. However FIG. 8 additionally depicts the resulting linear combination of interpolated luma samples within block C as marked by the 'X' marks within block C. Luma samples 1 and 3 represent the previously reconstructed luma samples attained by $P_L(2x,2y)$ when (x,y)=(0,0) and (x,y)=(1,0) respectively. And luma samples 2 and 4 represent the reconstructed luma samples attained by $P_L(2x,2y+1)$ when (x,y)=(0,0) and (x,y)=(1,0) respectively. The black block units found in block A neighboring to the left of current block C and the black block units found in block B neighboring to the top of current block C, are representations of previously reconstructed chroma samples that can be used to attain the α and β coefficients in Math Figure 3. The 'X' marks found in block A neighboring to the left of current block C and the 'X' marks found in block B neighboring to the top of current block C, are representations of linear interpolations of previously reconstructed luma samples that can be used to attain the α and β coefficients in Math Figure 3.

As mentioned above, FIG. 8 shows the result of attaining the linear combination of interpolated luma samples according to $P_{L*}(x,y)$. By way of example, taking luma sample 1 and luma sample 2, and applying the linear combination of interpolated luma samples according $P_{L*}(0,0)$, the result is indicated by the 'X' mark found in between luma sample 1 and luma sample 2 in FIG. 8.

Similarly, the 'X' found in between luma sample 3 and 4 represents the resulting linear combination of interpolated luma samples according to $P_{L*}(1,0)$. The remaining 'X' marks seen in FIG. 8 represent the linear interpolation resulting from $P_{L*}(0,1)$ and $P_{L*}(1,1)$ based on the remaining previously reconstructed luma samples found in the current block C. The α and β coefficients can be attained from the adjacent blocks A and B.

Now in order to process the actual intra chroma prediction, the linear combination of interpolated luma samples attained above, $P_{L*}(x,y)$, are collaborated along with the calculated α and β coefficients to then attain the intra chroma LM prediction, $P'_c(x,y)$, for the current chroma prediction unit. The exact calculation for the current chroma prediction unit according to the intra chroma LM prediction mode can be seen in Math Figure 3.

Figure 9:
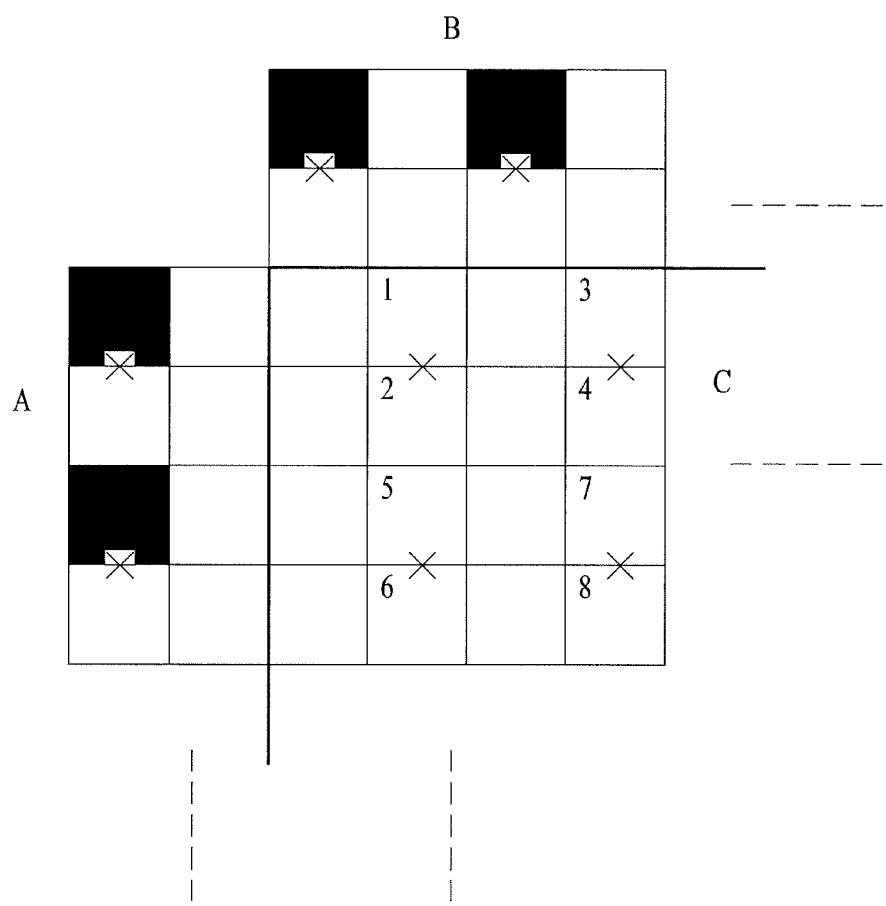
FIG. 9 illustrates the result of an interpolation process according to another embodiment of the present invention.

However, the present invention is not limited to only include a linear combination of interpolated luma samples as depicted in FIG. 8. In a second alternative embodiment for attaining a linear combination of interpolated luma samples, $P_{L*}(x,y)$, two different luma samples may be taken. FIG. 9 represents the second embodiment, and depicts the same close up view of the upper lefthand corner of current block C as depicted in FIG. 8. However, in FIG. 9 the resulting linear combination of interpolated luma samples have shifted one unit to the right compared to the result of the linear combination of interpolated luma samples as seen in FIG. 8. This shift can be accomplished by incorporating a shift in the luma samples taken when attaining $P_{L*}(x,y)$. Thus according to the second embodiment, a first luma sample may be taken at $P_L(2x+1,2y)$, and the second luma sample may be taken at $P_L(2x+1,2y+1)$.

So by shifting the luma samples from which to take the linear interpolation with, the second embodiment is able to provide further flexibility to the LM prediction mode. FIG. 9 depicts the resulting linear combination of interpolated luma samples according to the second embodiment by the location of the 'X' marks within block C.

The $P_{L*}(x,y)$ according to the second embodiment is attained by $$P_{L*}(x,y)=0.5*[P_L(2x+1,2y)+P_L(2x+1,2y+3)] \quad \text{[Math Figure 14]}$$

The calculations for the coefficients α and β remain the same as seen in Math FIG. 3 by attaining the linear interpolation of previously reconstructed luma samples, and previously reconstructed chroma samples from the neighboring blocks A and B. And similarly, the actual intra LM prediction for a current chroma prediction unit, $P'_c$, is still defined by Math FIG. 2. The only difference according to the second embodiment is the result of the linear combination of interpolated luma samples, $P_{L*}(x,y)$, that is due to a shift in luma samples taken within the current block C.

Figure 10:
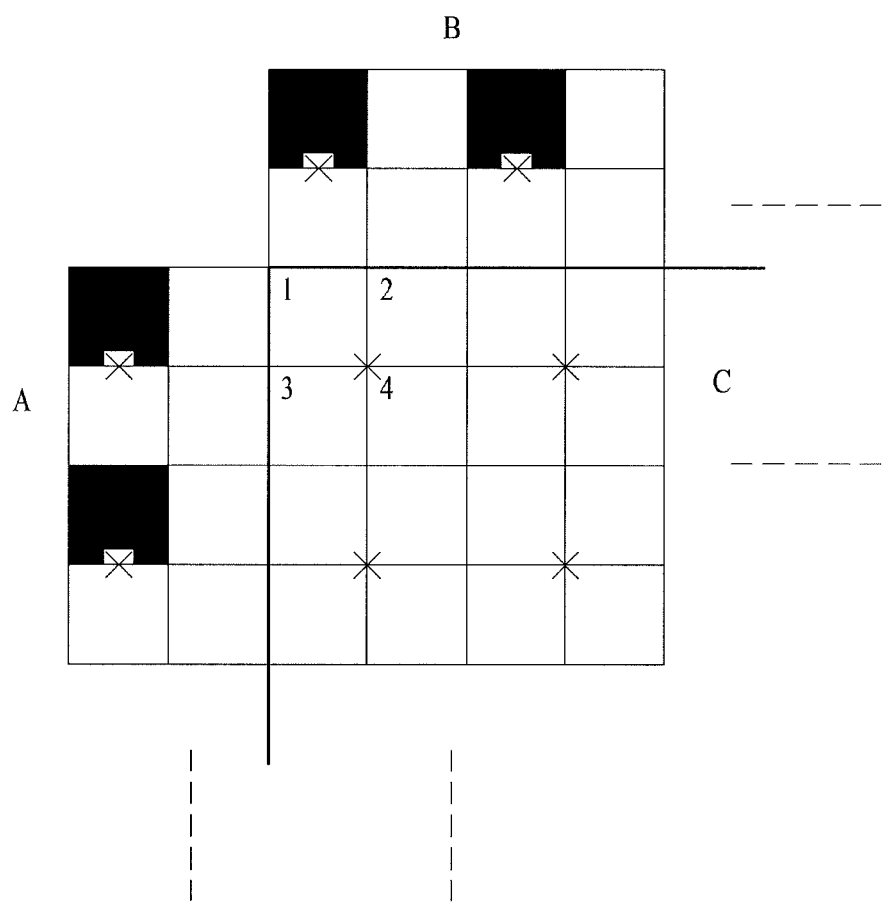
FIG. 10 illustrates the result of an interpolation process according to another embodiment of the present invention.

In a third embodiment for attaining a linear combination of interpolated luma samples, $P_{L*}(x,y)$, four different luma samples may be taken from within the current block C. FIG. 10 represents the third embodiment. FIG. 10 is the same close up portional view of the upper lefthand corner of the current block C as depicted in FIGS. 8 and 9. However, according to the third embodiment, four previously reconstructed luma samples are taken from block C to attain the $P_{L*}(x,y)$ instead of just the 2 as described in the first and second embodiments. These four previously reconstructed luma samples are marked as 1, 2, 3 and 4 in FIG. 10. The first luma sample, 1, can be attained by $P_L(2x,2y)$. The second luma sample, 2, can be attained by $P_L(2x+1,2y)$. The third luma sample, 3, can be attained by $P_L(2x,2y+1)$. And the fourth luma sample can be attained by $P_L(2x+1,2y+1)$. By taking the average of the four attained luma samples, the linear interpolation, $P_{L*}(x,y)$, according to the third embodiment can be attained. The 'X' mark found in the middle of luma samples 1, 2, 3 and 4 is a linear interpolation of the four previously reconstructed luma samples according to the third embodiment. The remaining 'X' marks depict the results from linear interpolations attained from the remaining previously reconstructed luma samples of current block C.

Thus the $P_{L*}(x,y)$ according to the third embodiment can be attained by $$P_{L*}(x,y)=0.25*[P_L(2x,2y)+P_L(2x+1,2y)+P_L(2x,2y+1)+P_L(2x+1,2y+1)] \quad \text{[Math Figure 5]}$$

The calculations for the coefficients α and β remain the same as seen in Math FIG. 3 by attaining the previously reconstructed luma and chroma samples from the adjacent blocks A and B. Therefore, according to the third embodiment, the intra chroma LM prediction for a current chroma prediction unit, $P'_c$, is still defined by Math Figure 2. The only difference occurs from the different result from the linear interpolation, $P_{L*}(x,y)$, due to the increase in luma samples being taken.

It is to be understood that the methods for attaining $P_{L*}(x,y)$ are not limited to the embodiments disclosed above. The above disclosed embodiments for attaining $P_{L*}(x,y)$ have been made to demonstrate preferable embodiments thereof, however it will be understood by those skilled in the art that various methods for attaining a linear interpolation of reconstructed luma samples are possible under the present invention without departing from the scope and spirit of the present invention.

Chroma Inter Prediction Modes

Chroma samples of inter prediction blocks did not previously have their own prediction modes. It was the case that chroma samples of an inter prediction block were prediction processed simply by following a prediction mode for a corresponding luma sample in a same prediction unit. However, according to the present invention, the LM prediction mode described in terms of intra chroma prediction is made available for inter chroma prediction.

Inter predictions also involve prediction processing the luma samples prior to processing the chroma samples of any given prediction unit. This means that previously reconstructed luma samples are available when processing a prediction on a current chroma prediction unit. Therefore the basic processing for inter chroma LM prediction will be processed the same as described above for intra chroma LM prediction. The only difference is that for inter prediction, luma samples belonging to the same prediction unit as the current chroma prediction unit, are reconstructed by making reference to reference pictures that are different from a current picture that includes the current chroma prediction unit.

Therefore, although the method for reconstructing luma samples are different according to the intra prediction mode and inter prediction mode, after obtaining reconstructed luma samples belonging to a same prediction unit, a chroma prediction unit can be prediction processed in an inter LM prediction mode. Then the reconstructed luma samples included in the same prediction unit can be taken to form a linear combination and then interpolated for processing of an inter chroma LM prediction mode. Similarly the α and β coefficients seen in Math Figure 3 may be attained by utilizing motion vector compensation to process the reconstruction of luma and chroma samples in prediction units neighboring the current chroma prediction unit. And a linear interpolation may be applied to a neighboring luma sample to obtain the α and β coefficients.

And once the linear combination of previously reconstructed luma samples are interpolated, and the necessary luma and chroma samples needed to calculate the α and β coefficients seen in Math Figure 3 are obtained, the inter chroma LM prediction mode can be processed on the current chroma prediction unit according to Math Figure 2.

Signaling for Intra Chroma LM Prediction Mode

Transmission of a video signal will include encoded video data arranged into block data formats, wherein the blocks contain luma samples and chroma samples that are a prediction from an original video source. Also included in the video signal along with the actual video data will be a variety of information data relating to various characteristics of the video data. The information data may include size information for blocks, instructional flags and block type information among other possible information data. Among the variety of information data included in the transmission signal, there will be prediction mode information relating to each block of encoded video data. The prediction mode information indicates which available prediction mode was used to encode video data. The prediction mode information is transmitted along with the encoded video data so that a decoder that receives the encoded video data can which prediction mode was used for prediction processing at the encoding unit, so that the same prediction mode can be used to accurately reconstruct the video data at the decoding unit.

In any prediction process for reconstruction of a block in a decoder, the luma samples are the first to be prediction processed. So for example in a 2×2 pixel size block found in 4:2:0 sampling, there will be four luma samples and a set of corresponding chroma samples. And in this case, the four luma samples will be prediction processed for reconstruction before the corresponding set of chroma samples.

In a preferred embodiment, there are thirty four (34) intra prediction modes available, when including each of the angular modes (3 . . . 33). FIG. 11A depicts the thirty four intra prediction modes according to the preferred embodiment. As can be seen from FIG. 11A, the vertical prediction mode, horizontal prediction mode and DC prediction mode are available for intra luma prediction. The angular prediction mode also seen in FIG. 11A is available for both intra luma prediction and intra chroma prediction. The intra chroma angular prediction mode may be processed on a current chroma prediction unit by identifying the DM prediction mode as the intra chroma prediction mode when the corresponding intra luma prediction mode is the angular prediction mode. The processing for the vertical prediction mode, horizontal prediction mode and DC prediction mode prediction modes are described above with reference to FIGS. 4A-C. The DM prediction mode is unique to intra chroma prediction.

Figure 12:
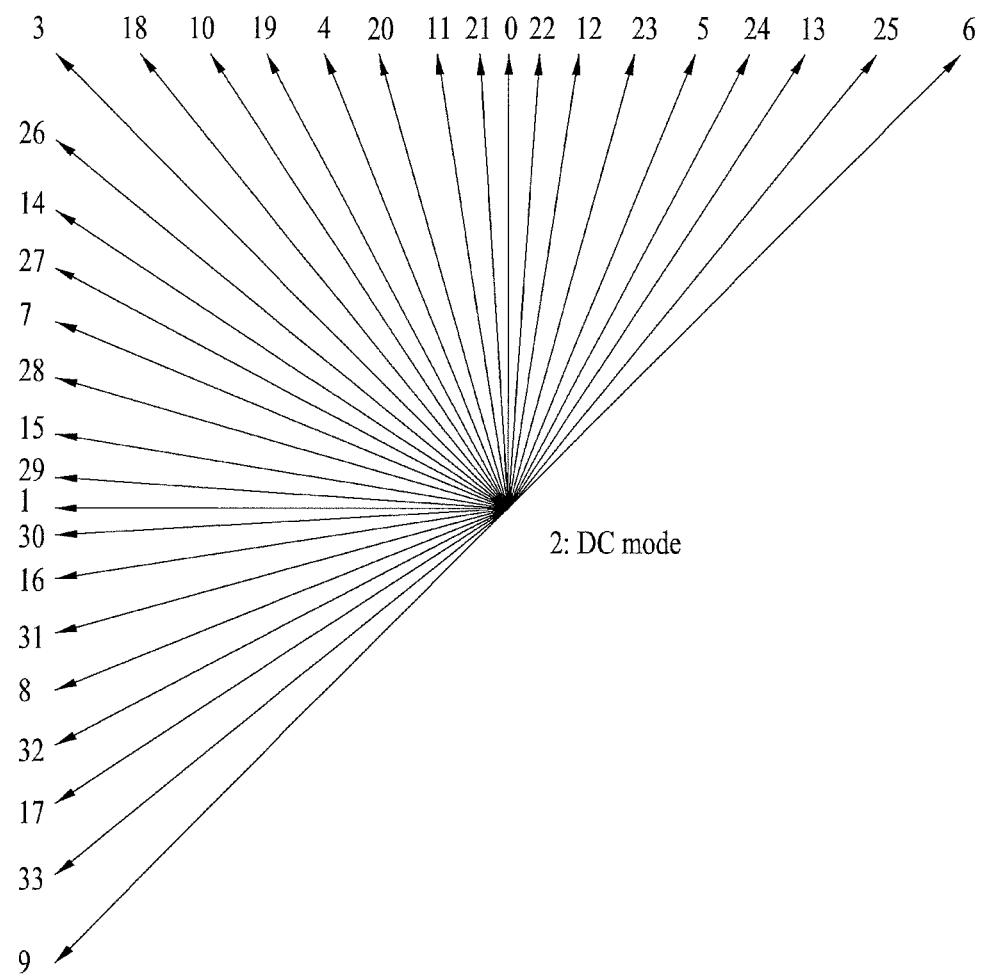
FIG. 12 is a graphical illustration of available prediction modes according to some of the embodiments in the present invention.

A more detailed description for the angular prediction mode will now be given. The intra Angular prediction mode, corresponding to intra prediction mode information values '3-33', predicts a current prediction unit based on an angular representation of previously predicted samples that adjacently neighbors the current prediction unit at an angle corresponding to the angles depicted in FIG. 12. As seen in FIG. 12, each value between '3-33' for the intra luma prediction modes actually corresponds to a distinct angular prediction mode. FIG. 12 also depicts an illustrative depiction for the intra DC prediction mode having a corresponding intra prediction mode information value of '2'.

While the preferred embodiment for intra luma prediction modes depicted in FIG. 11A does not include a separate intra luma LM prediction mode, an alternative embodiment may include such an LM prediction mode for processing intra predictions of luma samples. FIG. 11B depicts the alternative embodiment that includes the intra luma LM prediction mode. For ease of explanation the LM intra prediction mode was given the value of '34' in the table depicted by FIG. 11B. This allows the thirty four intra luma prediction modes from the preferred embodiment depicted in FIG. 11A to keep their original values in the alternative embodiment depicted in FIG. 11B. However the value assigned to the intra luma LM prediction mode is not limited to the '34' depicted in FIG. 11B.

For instance, another alternative embodiment may assign the intra luma LM prediction mode a value of '3'. In this alternative embodiment the vertical prediction mode is assigned a value of '0', the horizontal prediction mode is assigned a value of '1', the DC prediction mode is assigned a value of '2', the LM mode is assigned a value of '3' and the angular prediction mode is assigned the remaining values '4 . . . 33'. A table for identifying this third alternative embodiment is detailed by Table 3 below.

TABLE 3

| intraPredMode | Name of intraPredMode |
| --- | --- |
| 0 | Intra_Vertical |
| 1 | Intra_Horizontal |
| 2 | Intra_DC |
| 3 | Intra_LM |
| Otherwise (4 . . . 34) | Intra_Angular |

While only the three embodiments for possible intra prediction modes for luma samples have been explained herein, it is within the scope of the present invention to switch the prediction mode values for any of the prediction modes shown to be available according to the intra luma prediction modes disclosed above. As long as each of the available prediction modes can be clearly distinguish and not confused with another prediction mode, any value may be assigned to each of the available prediction modes for intra luma prediction processing. This holds true for the numbering of the intra chroma prediction mode values as well.

Figure 13:
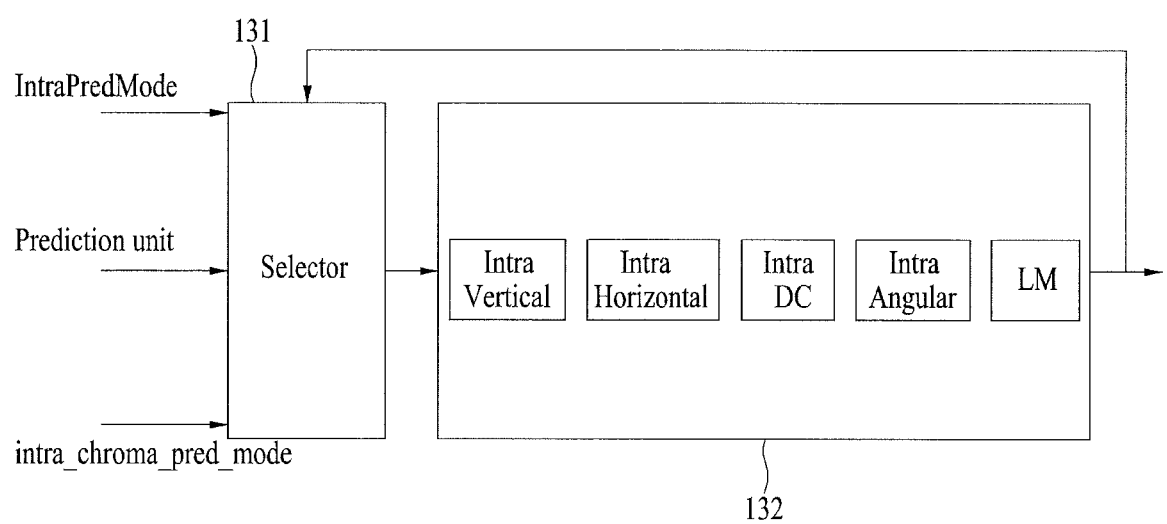
FIG. 13 is a block diagram of a prediction processing unit according to a preferred embodiment of the present invention.

FIG. 13 depicts a representation of a prediction circuit for determining the proper intra prediction mode within a video signal receiving unit. The IntraPredMode illustrates intra prediction mode information assigned from an encoding unit prior to transmission for identifying a proper intra prediction mode for processing a luma prediction unit. The intra_chroma_pred_mode illustrates intra prediction mode information assigned by an encoding unit prior to transmission for identifying a proper intra prediction mode for processing a chroma prediction unit. And the Prediction Unit illustrates the video data that is received by the receiving decoding unit to be prediction processed according to a corresponding intra prediction mode. Although FIG. 13 depicts the Prediction Unit being input to the Selector 131 along with the intra prediction mode information, it is within the scope of the present invention that the Prediction Unit data bypasses the Selector and is directly inputted into the prediction unit 132.

For an intra luma prediction process, a luma Prediction Unit along with a corresponding IntraPredMode information is input to the selector 131. The available IntraPredMode are disclosed in FIGS. 11A and 11B, as explained above. Because intra luma prediction mode information is received prior to intra chroma prediction mode information, the luma Prediction Unit will be directly according to the corresponding IntraPredMode information. Thus the selector 131 need only output IntraPredMode to the prediction unit 132 where the IntraPredMode information will identify the proper intra prediction mode for processing a prediction for the luma prediction unit. The luma prediction unit is then processed directly in the prediction unit 132 according to the intra prediction mode identified by the IntraPredMode information. After the luma prediction unit is prediction processed according to the intra prediction mode available in the prediction unit 132, the reconstructed luma prediction unit is then output for display. In addition, the IntraPredMode information will be fedback to the selector 131 for use when chroma prediction units from the same block will be prediction processed later.

Figure 17:
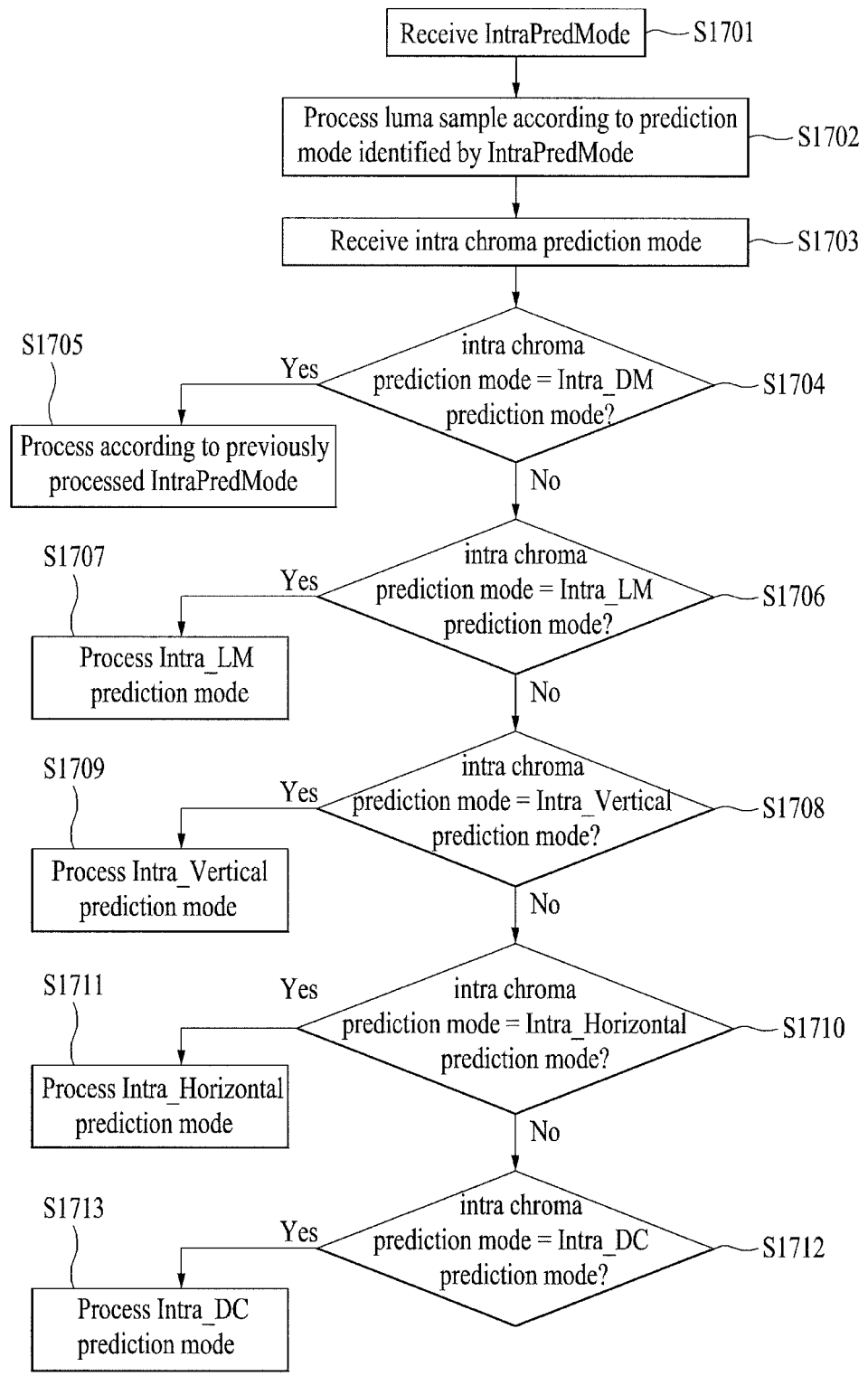
FIG. 17 is a flowchart illustrating a signaling method for identifying a proper intra chroma prediction mode according to an embodiment of the present invention.

FIG. 17 illustrates a possible sequence of determinations that must be made by the selector 131 when determining a proper output for instructing the prediction unit to perform the proper intra_chroma_pred_mode on an intra chroma prediction unit. After receiving the IntraPredMode information in step S1701 and processing the luma prediction units according to the IntraPredMode in step S702, chroma prediction units will be input to the selector 131 along with corresponding intra_chroma_pred_mode information in step S1703. If the intra_chroma_pred_mode information identifies an Intra_DM prediction mode, then the selector 131 must refer to the previously processed IntraPredMode that was fedback to the selector 131 in step S1705. If the intra_chroma_pred_mode does not identify the Intra_DM prediction mode, then the selector reads the intra_chroma_pred_mode information and outputs the proper information to the prediction unit 132 to process the corresponding intra_chroma_pred_mode in steps S1707, S1709, S1711 and S1713. Although FIG. 17 depicts a selector going through the sequence of determining whether the intra_chroma_pred_mode information identifies an Intra_LM prediction mode at S1706, to whether it identifies Intra_Vertical prediction mode, to whether it identifies Intra_Horizontal and finally whether it identifies Intra_DC prediction mode, the selector according to the present invention is not limited to always adhering to such a sequence. Any sequence of determination of identifying intra_chroma_pred_mode is within the scope of the present invention. Also, although FIG. 17 depicts a sequence of determination steps being followed, according to a preferred embodiment of the present invention luma and chroma samples of a same prediction unit may be prediction processed in parallel. In other words all luma samples of a prediction need not be actually completely prediction processed before prediction processing a corresponding chroma sample of the same sample unit. As long as the intra luma prediction mode information is received, a decoding unit may begin the process for prediction processing the corresponding chroma sample according to the DM prediction mode. Thus operationally, as soon as selector 131 receives IntraPredMode information identifying a prediction mode for the luma sample, prediction processing for a chroma sample of the same prediction unit can be initiated in parallel.

The mapping table depicted in FIGS. 14A and 14B maps the intra luma prediction mode information, IntraPredMode, and intra chroma prediction mode information, intra_chroma_pred_mode,that is transmitted along with encoded video data. The result of such intra prediction mode information being assigned for transmission is represented in the cross matching body of the mapping tables. The resulting value from the mapping tables of FIG. 14A and FIG. 14B may be referred to as IntraPredModeC. The mapping tables are to be understood from the standpoint of each instance of a received IntraPredMode value.

For example, if the previously received IntraPredMode is '0', corresponding to an Intra_Vertical prediction mode, then the values that will be assigned to each of the available intra chroma prediction modes in this instance will be found below within the same column. So staying under the assumption that IntraPredMode identifies the Intra_Vertical prediction mode, if the selector 131 receives a value of '0' for intra_chroma_pred_mode, then according to FIG. 14A IntraPredModeC will correspond to a value of '34'. Then referring back to FIG. 11B it is seen that '34' identifies the Intra_LM prediction mode.

Staying under the assumption that IntraPredMode still identifies the Intra_Vertical prediction mode, if the Intra_Vertical prediction mode is to be signaled for chroma prediction there is no need for the intra_chroma_prediction_mode information to specifically transmit the value for Intra_Vertical prediction mode, thus the 'n/a' value. This is because information pertaining to the Intra_Vertical prediction mode is already known from the intra luma prediction, and Intra_Vertical prediction mode can be invoked by simply referring to the Intra_DM prediction mode. The Intra_DM prediction mode allows the chroma prediction mode to follow the corresponding luma prediction mode. So when IntraPredMode is the Intra_Vertical prediction mode, there is no need to specifically assign a value for Intra_Vertical prediction mode for the chroma sample due to the availability of the Intra_DM prediction mode. For all other prediction modes while IntraPredMode has a value '0', a specific value must be assigned to specify the proper intra chroma prediction mode. So when IntraPredMode is still '0' and the selector 131 subsequently receives an intra_chroma_pred_mode of '3', then the selector 131 will know that an Intra_DC prediction mode is being signaled. Then referring back to FIG. 11B, it is seen that Intra_DC prediction mode corresponds to the value '2'. And this is what is depicted as the IntraPredModeC result of FIG. 14A.

Now when IntraPredMode is the Intra_Horizontal prediction mode '1', there is similarly no need for the intra_chroma_pred_mode information to specifically transmit the value relating to the Intra_Horizontal prediction mode, thus the 'n/a' value seen in Table 14A. Instead when IntraPredMode has a value '1' and intra_chroma_pred_mode has a value '4', then the resulting IntraPredModeC from Table 14A is '1', which identifies the Intra_Horizontal prediction mode as seen in FIG. 11B. However if IntraPredMode has a value of '1' and an Intra_DC prediction mode is desired for intra chroma prediction, IntraPredModeC, then intra_chroma_pred_mode has a value of '3', and this corresponds to a value of '2' in the mapping table of FIG. 14A. Where in FIG. 11B, '3' is seen to identify the Intra_DC prediction mode.

Chroma prediction units may be prediction processed according to the Intra_Angular prediction mode when IntraPredMode indicates intra luma angular prediction mode, and intra_chroma_pred mode identifies the Intra_DM prediction mode.

By utilizing the Intra_DM prediction mode, bits of a binary codeword corresponding to each intra prediction mode can effectively be conserved and reduced. This savings in bits becomes more apparent when viewing FIG. 14B and FIG. 15. FIG. 14B is the same mapping table as depicted in FIG. 14A except the numerical values have been swapped out for the binary bitstream codeword bits that are actually transmitted in a digital signal. For cases where the IntraPredMode value that is transmitted first corresponds to the Intra_Vertical, Intra_Horizontal and Intra_DC prediction modes (0, 1, 2), the binary bit codeword required to signal the appropriate intra chroma prediction mode can be shortened to a maximum of three bits. This is because the Intra_DM prediction mode allows for one of the commonly shared prediction modes to become obsolete in these cases, as represented by the 'n/a'. The significance of the Intra_DM prediction mode, then, is that for each instance where IntraPredMode identifies one of the Intra_Vertical, Intra_Horizontal and Intra_DC prediction modes (0, 1, 2), the 'n/a' in the mapping table of FIG. 14B indicates that the encoding unit is free from assigning a separate codeword value for the corresponding intra chroma prediction mode. So one less intra prediction mode needs to be assigned a codeword thanks to the Intra_DM prediction mode.

From a binary bit codeword standpoint, this allows for the use of max three bit codewords of '0', '10', '111' and '110' to assign to the four intra chroma prediction modes that need to be separately distinguished when the IntraPredMode corresponds to Intra_Vertical, Intra_Horizontal and Intra_DC prediction modes. If the Intra_DM prediction mode were not available, then in all instances five separate intra chroma prediction modes would need to be distinguished. If five distinct codewords are needed, then this increases the necessary codeword bit length to increase to a maximum of four bits. This can be seen in the case where the IntraPredMode is the Intra_Angular prediction mode. In this case, each intra prediction modes must be assigned one of '0', '10', '110', '1111', '1110' binary codewords. During a binary bitstream it is difficult to distinguish between '1', '11, '111' and '1111' and thus more than one of these codeword values are preferred not to be used when assigning to an intra chroma prediction mode for each IntraPredMode instance.

It is noted that each instance of the IntraPredMode may assign its own binary bit codeword to correspond to an intra chroma prediction mode. This is why for the case where IntraPredMode is '0', the codeword value to signal Intra_DC prediction mode for chroma samples can be '110', and for the case where IntraPredMode is '2', the codeword value to signal Intra_Horizontal prediction mode for a chroma sample can also be assigned '110'. Each instance of IntraPredMode can assign its own codeword value for the available intra chroma prediction modes. According to a preferred embodiment of the present invention, the Intra_DM prediction mode will be assigned the binary codeword '0' corresponding to the shortest binary bit length. Also according to a preferred embodiment of the present invention, the Intra_LM prediction mode will be assigned the binary codeword having the second shortest binary bit length, '10'.

However, it is within the scope of the present invention to assign any one of the codewords to any one of the available prediction modes shown in FIG. 15 in alternative embodiments.

For example, if it is later determined that intra chroma samples are increasingly being predicted according to the Intra_DC mode, then the Intra_DC prediction mode may be assigned the codeword '0' to conserve the amount of codeword bits that need to be transmitted. It is also within the scope of the present invention to adaptively change the assignment of prediction mode codewords during the transmission or reception of a video signal. For instance if it is determined that certain video sequences require a large number of Intra_LM mode prediction processing, then for those video sequences the Intra_LM prediction mode may be assigned the codeword with the smallest number of bits, '0'. Then later if another video sequence within the video signal finds that a large number of Intra_Horizontal prediction mode processing is required, then the Intra_Horizontal prediction mode may be assigned the codeword having the smallest number of bits, '0'. Therefore it is within the scope of the present invention to adaptively assign binary codeword values for prediction mode identification in an effort to conserve the total number of bits that need to be transmitted.

In the alternative embodiment where the Intra_LM prediction mode is made available for the prediction processing of luma samples, the mapping table may be depicted as shown below in Table 4. According to Table 4, the Intra_LM prediction mode corresponds to IntraPredMode having a value of '3', whereas the values for intra_chroma_pred_mode remain the same as seen in FIG. 14A. As mentioned regarding FIG. 11B, the value assigned to IntraPredMode for identifying the Intra_LM prediction mode for luma samples, may be changed adaptively. Thus the makeup of Table 4 may also change depending on the value assigned to IntraPredMode for identifying the Intra_LM prediction mode for luma samples.

TABLE 4

| | Intra_PredMode[xB][yB] | | | | |
|---|---|---|---|---|---|
| intra_chroma_pred_mode | 0 | 1 | 2 | 3 | X (4 <= X <= 34) |
| 0 | 3 | 3 | 3 | n/a | 3 |
| 1 | n/a | 0 | 0 | 0 | 0 |
| 2 | 1 | n/a | 1 | 1 | 1 |
| 3 | 2 | 2 | n/a | 2 | 2 |
| 4 | 0 | 1 | 2 | 3 | X |

Figure 16:
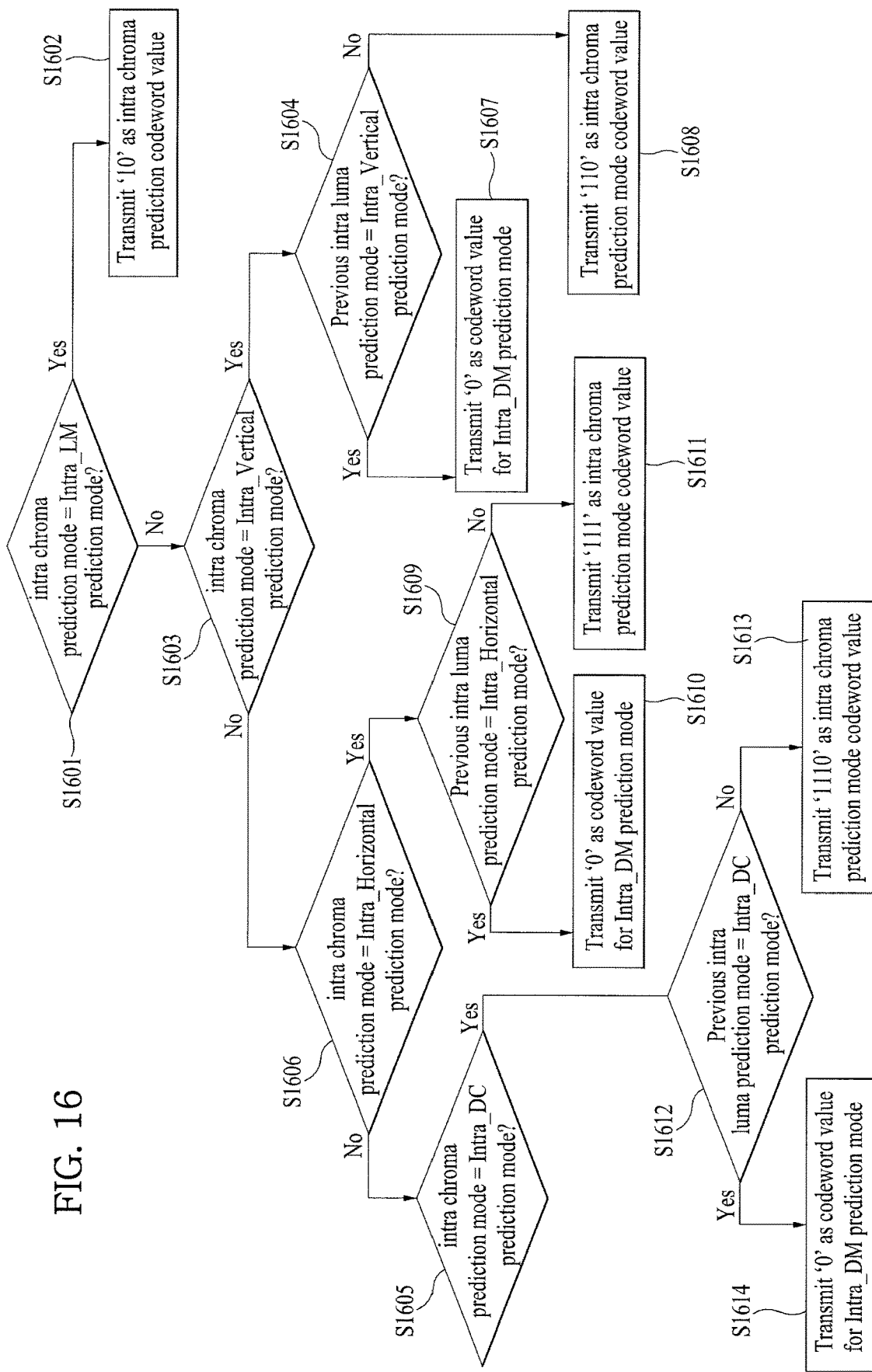
FIG. 16 is a flowchart illustrating the transmission of intra prediction mode values.

The steps for determining which binary codeword value to transmit from an encoder with respect to an intra chroma prediction mode according to a preferred embodiment is outlined in FIG. 16.

Figure 18:
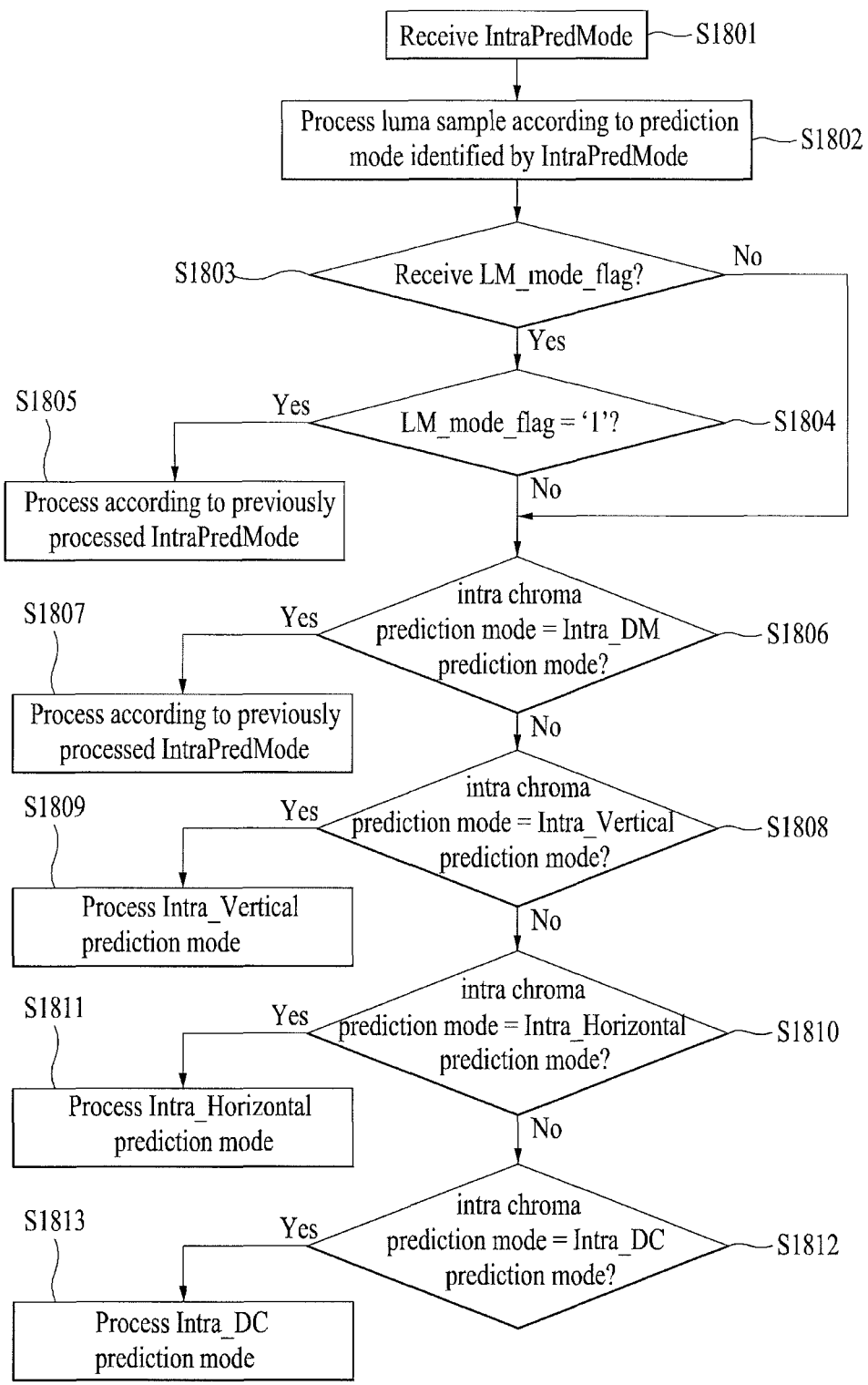
FIG. 18 is a flowchart illustrating a signaling method for identifying a proper intra chroma prediction mode according to another embodiment of the present invention.

FIG. 18 describes an alternative embodiment for identifying when the Intra_LM prediction mode is to be selected as the proper intra chroma prediction mode by a decoding unit. The alternative embodiment illustrated in FIG. 18 operates in much the same way as the preferred embodiment illustrated in FIG. 17. However the alternative embodiment in FIG. 18 contemplates receiving an Intra_LM prediction mode flag as part of the transmitted prediction mode information. If for some reason an Intra_LM prediction mode flag is missing from the received prediction mode information, step S1806 provides that prediction processing is handled according to the preferred embodiment outlined in FIG. 17. If the Intra_LM prediction mode flag is received, then it is determined whether the Intra_LM prediction mode flag has a first value (eg. value of '1') indicating an Intra_LM prediction mode is to be processed S1804. If the Intra_LM prediction mode flag does have the first value, then a current chroma prediction unit will automatically undergo the Intra_LM prediction mode processing S1805. If the Intra_LM prediction mode flag has a second value indicating an Intra_LM prediction mode is not to be processed, then the current intra chroma prediction unit will be handled according to the preferred embodiment outlined in FIG. 17 starting from S1806.

Figure 19:
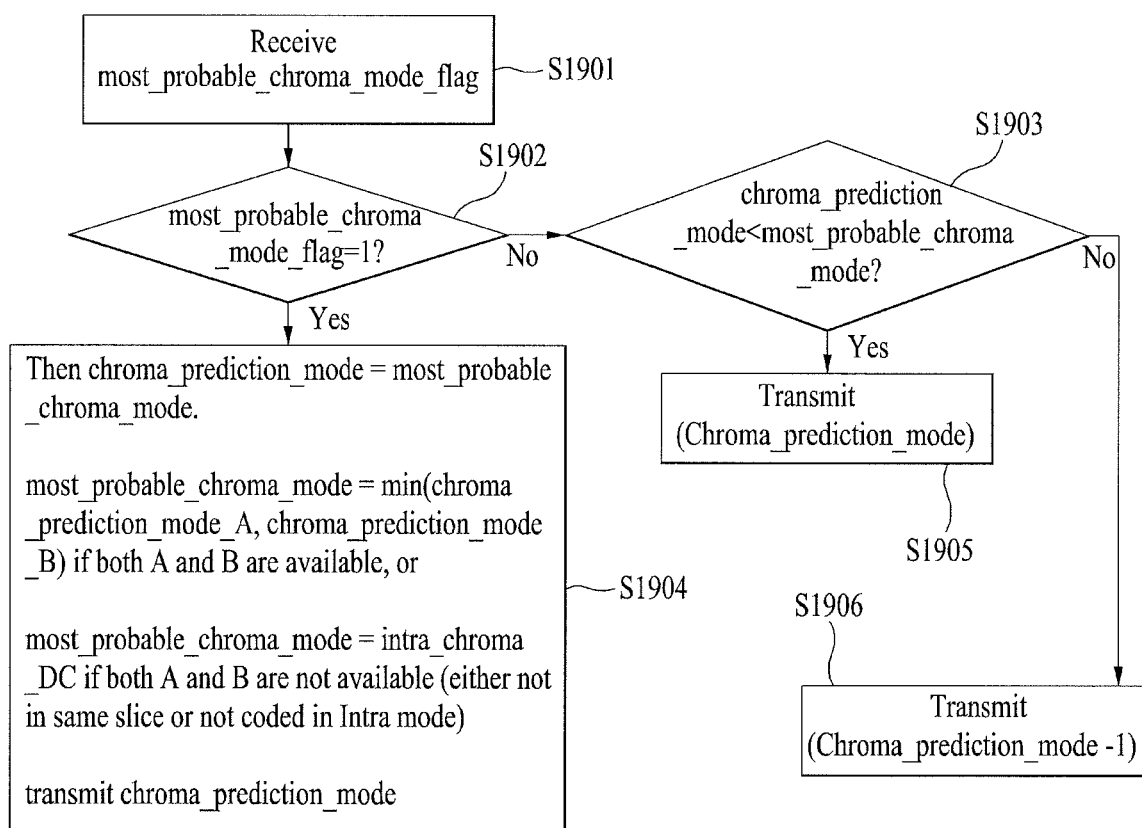
FIG. 19 is a flowchart illustrating a signaling method for identifying a proper intra chroma prediction mode according to another embodiment of the present invention.

FIG. 19 describes yet another alternative embodiment for signaling the LM prediction mode is to be processed by a decoding unit for a chroma prediction unit. After a most_probable_chroma_mode_flag is received S1901, if the most_probable_chroma_mode_flag has a first value (eg. '1'), then the chroma_prediction_mode will follow the current mode identified for the most_probable_chroma_mode. The most_probable_chroma_mode is defined as min(chroma_prediction_mode_A, chroma_prediction_mode_B) if both A and B are available S1904. A and B refer to blocks neighboring a current block C that includes the current chroma prediction unit that requires prediction processing. Both block A and block B are assumed to be previously reconstructed and thus available for determining which prediction mode was used to reconstruct them. Thus the min(A,B) function compares the values of the prediction mode used to reconstruct block A and block B, where the actual numerical values can be obtained according to the values found in either Table 1 or Table 2. As an alternative, a max(A,B) function may be applied instead of the min(A,B) function. And in yet another alternative, multiple blocks (A, B, C, etc . . . ) may be taken to apply the min( ), max( ), or any other applicable function.

If neighboring blocks A and B are not available, then the chroma_prediction_mode is automatically identified as the Intra_DC prediction mode S1904. A neighboring block is considered not to be available when the neighboring block is not within the same slice as the current block C, or if the neighboring block is not an intra predicted block. At the end of the processing in S1904, whatever the current value determined for chroma_prediction_mode will be transmitted to identify an intra chroma prediction mode for prediction processing the current chroma sample.

If the most_probable_chroma_mode_flag has a second value, then the chroma_prediction_mode is compared against the most_probable_chroma_mode S1903. If the chroma_prediction_mode has a value less than the most_probable_chroma_mode, then the current value for chroma_prediction_mode is transmitted for prediction processing S1905. If the chroma_prediction_mode has a value that is not less than the most_probable_chroma_mode, then an intra chroma prediction mode corresponding to an identification value of one less than the chroma_prediction_mode will be transmitted for prediction processing. Or as an alternative, if the chroma_prediction_mode has a value that is not less than the most_probable chroma_mode, then an intra chroma prediction mode corresponding to an identification value of one more than the chroma_prediction_mode will be used for prediction processing. And in yet another alternative, if the chroma_prediction_mode has a value that is not less than the most_probable_chroma_mode, then any of the available intra chroma prediction modes available may be set as a default mode for prediction processing. For example an Intra_DC mode may be used in this alternative.

While the description has thus far been made for all cases of intra chroma prediction processing, the present invention also considers making the Intra_LM prediction mode only available for certain sizes of chroma transform units. A chroma transform unit is determined during the encoding process and refers to the size of the chroma sample that will be transformed (ie. during the DCT transform process). Thus the chroma transform unit size must be determined by an encoding unit prior to assigning a prediction mode type when preparing the information for transmission. For instance the Intra_LM prediction mode may be unavailable for chroma prediction when the chroma sample transform unit size is larger than 8 (ie. 8×8 pixels). In this case the size of the chroma transform unit must first determined before assigning the prediction mode type. Likewise, when receiving the video data transmission, the decoding unit will receive and read the chroma transform unit size information before reading the prediction mode type. This ensures that the decoding unit will realize when an Intra_LM prediction mode will not be made available.

If the availability of the Intra_LM is set to depend on the size of a chroma transform unit, it stands that information identifying the size of the chroma transform unit must be transmitted prior to the transmission of the information indicating the prediction mode type. FIGS. 20 and 21 provide an illustration of how on the decoding unit side, the transform unit size will be identified prior to identifying an intra prediction mode type. Because the transmission signal inputs the transform unit size information, before the prediction mode type information, this ensures that the decoding unit will parse the transform unit size information before parsing the prediction mode type information.

Although the transform unit size of 8 is specifically mentioned, it is within the scope of the invention to choose a different transform size for determining when to cut off the availability of the Intra_LM prediction mode for chroma prediction processing. In the event that the Intra_LM prediction mode is not made available, an alternative prediction mode such as an Intra_Vertical8 prediction mode may be assigned. It is within the scope of the present invention that instead of the Intra_Vertical8 prediction mode, another available intra prediction mode is assigned.

Also, according to a preferred embodiment the chroma transform unit size is set to automatically equal the transform unit size of a corresponding luma transform unit size. Thus according to the preferred embodiment seen in FIGS. 20 and 21 the transform unit size identifying the luma transform unit size will be taken as the chroma transform unit size. However, it is within the scope of the present invention that the transform unit size for a chroma may be determined independent from the luma transform unit size. In this alternative, the transmission of information will include chroma transform unit size information. And the chroma transform unit size information will be transmitted such that the chroma transform unit size information will be parsed by the decoding unit prior to parsing a prediction mode type.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for decoding a bitstream for a video signal by a decoding apparatus, the method comprising:
    obtaining, by the decoding apparatus, intra luma prediction mode information of a current block from the bitstream, the intra luma prediction mode information specifying an intra prediction mode for a luma sample of the current block;
    obtaining, by the decoding apparatus, intra chroma prediction mode information of the current block from the bitstream, the intra chroma prediction mode information specifying an intra prediction mode for a chroma sample of the current block; and
    decoding, by the decoding apparatus, the current block based on the intra luma prediction mode information and the intra chroma prediction mode information of the current block,
    wherein decoding the current block includes:
    determining, by the decoding apparatus, the intra prediction mode for the luma sample based on the intra luma prediction mode information of the current block,
    reconstructing, by the decoding apparatus, the luma sample of the current block based on the intra prediction mode for the luma sample,
    determining, by the decoding apparatus, the intra prediction mode for the chroma sample according to a predefined table based on the intra prediction mode for the luma sample and the intra chroma prediction mode information of the current block, wherein, based on the intra chroma prediction mode information having a specific value, the intra prediction mode for the chroma sample is set equal to the intra prediction mode for the luma sample, and reconstructing, by the decoding apparatus, the chroma sample of the current block based on the intra prediction mode for the chroma sample.

2. The method of claim 1, wherein the specific value is 4.

3. The method of claim 1, wherein, based on the intra chroma prediction mode information having a value of 1, the intra prediction mode for the chroma sample is set to a vertical prediction mode, and wherein the vertical prediction mode indicates performing intra prediction based on a reconstructed sample of a top neighboring block of the current block.

4. The method of claim 1, wherein, based on the intra chroma prediction mode information having a value of 2, the intra prediction mode for the chroma sample is set to a horizontal prediction mode, and wherein the horizontal prediction mode indicates performing intra prediction based on a reconstructed sample of a left neighboring block of the current block.

5. The method of claim 1, wherein, based on the intra chroma prediction mode information having a value of 3, the intra prediction mode for the chroma sample is set to a DC prediction mode, and wherein the DC prediction mode indicates performing intra prediction based on a mean of reconstructed samples in a top neighboring block and a left neighboring of the current block.

6. The method of claim 1, wherein the intra prediction mode for the luma sample includes a DC prediction mode and an angular prediction mode, and wherein the DC prediction mode indicates performing intra prediction based on a mean of reconstructed samples in a top neighboring block and a left neighboring block of the current block, and the angular prediction mode indicates performing intra prediction based on an angular representation of a predicted sample for the current block.

7. The method of claim 1, wherein the current block is a block resulting from a partitioning of a treeblock, the treeblock being a block resulting from a partitioning of a slice.

8. The method of claim 7, wherein the treeblock has a size of 64×64 pixels.

9. The method of claim 1, wherein a picture including the current block has one of 4:2:0, 4:2:2, and 4:4:4 sampling ratios between a luma component and chroma components.

10. An apparatus for decoding a bitstream for a video signal, the apparatus comprising:

a decoding unit configured to obtain intra luma prediction mode information of a current block from the bitstream, the intra luma prediction mode information specifying an intra prediction mode for a luma sample of the current block, configured to obtain intra chroma prediction mode information of the current block from the bitstream, the intra chroma prediction mode information specifying an intra prediction mode for a chroma sample of the current block, and configured to decode the current block based on the intra luma prediction mode information and the intra chroma prediction mode information of the current block, wherein decoding the current block includes:

determining the intra prediction mode for the luma sample based on the intra luma prediction mode information of the current block, reconstructing the luma sample of the current block based on the intra prediction mode for the luma sample, determining the intra prediction mode for the chroma sample according to a predefined table based on the intra prediction mode for the luma sample and the intra chroma prediction mode information of the current block, wherein, based on the intra chroma prediction mode information having a specific value, the intra prediction mode for the chroma sample is set equal to the intra prediction mode for the luma sample, and reconstructing the chroma sample of the current block based on the intra prediction mode for the chroma sample.

11. The apparatus of claim 10, wherein the specific value is 4.

12. The apparatus of claim 10, wherein, based on the intra chroma prediction mode information having a value of 1, the intra prediction mode for the chroma sample is set to a vertical prediction mode, and wherein the vertical prediction mode indicates performing intra prediction based on a reconstructed sample of a top neighboring block of the current block.

13. The apparatus of claim 10, wherein, based on the intra chroma prediction mode information having a value of 2, the intra prediction mode for the chroma sample is set to a horizontal prediction mode, and wherein the horizontal prediction mode indicates performing intra prediction based on a reconstructed sample of a left neighboring block of the current block.

14. The apparatus of claim 10, wherein, based on the intra chroma prediction mode information having a value of 3, the intra prediction mode for the chroma sample is set to a DC prediction mode, and wherein the DC prediction mode indicates performing intra prediction based on a mean of reconstructed samples in a top neighboring block and a left neighboring of the current block.

15. The apparatus of claim 10, wherein the intra prediction mode for the luma sample includes a DC prediction mode and an angular prediction mode, and wherein the DC prediction mode indicates performing intra prediction based on a mean of reconstructed samples in a top neighboring block and a left neighboring block of the current block, and the angular prediction mode indicates performing intra prediction based on an angular representation of a predicted sample for the current block.

16. The apparatus of claim 10, wherein the current block is a block resulting from a partitioning of a treeblock, the treeblock being a block resulting from a partitioning of a slice.

17. The apparatus of claim 16, wherein the treeblock has a size of 64×64 pixels.

18. The apparatus of claim 10, wherein a picture including the current block has one of 4:2:0, 4:2:2, and 4:4:4 sampling ratios between a luma component and chroma components.

19. A method for encoding a bitstream for a video signal by an encoding apparatus, the method comprising:

obtaining, by the encoding apparatus, an intra prediction mode for a luma sample of a current block;

obtaining, by the encoding apparatus, an intra prediction mode for a chroma sample of the current block; and encoding, by the encoding apparatus, the current block based on the intra prediction mode for the luma sample of the current block and the intra prediction mode for the chroma sample of the current block, wherein encoding the current block includes:

encoding, by the encoding apparatus, intra luma prediction mode information of the current block, the intra luma prediction mode information specifying the intra prediction mode for the luma sample, encoding, by the encoding apparatus, the luma sample of the current block based on the intra prediction mode for the luma sample, encoding, by the encoding apparatus, intra chroma prediction mode information of the current block, the intra chroma prediction mode information specifying the intra prediction mode for the chroma sample, and encoding, by the encoding apparatus, the chroma sample of the current block based on the intra prediction mode for the chroma sample, wherein the intra chroma prediction mode information of the current block is determined according to a predefined table based on the intra prediction mode for the luma sample and the intra prediction mode for the chroma sample, wherein, based on the intra prediction mode for the chroma sample being equal to the intra prediction mode for the luma sample, the intra chroma prediction mode information has a specific value.

20. An apparatus for encoding a video signal, the apparatus comprising:

an encoding unit configured to obtain an intra prediction mode for a luma sample of a current block, configured to obtain an intra prediction mode for a chroma sample of the current block, and configured to encode the current block based on the intra prediction mode for the luma sample of the current block and the intra prediction mode for the chroma sample of the current block, wherein encoding the current block includes:

encoding intra luma prediction mode information of the current block, the intra luma prediction mode information specifying the intra prediction mode for the luma sample, encoding the luma sample of the current block based on the intra prediction mode for the luma sample, encoding intra chroma prediction mode information of the current block, the intra chroma prediction mode information specifying the intra prediction mode for the chroma sample, and encoding the chroma sample of the current block based on the intra prediction mode for the chroma sample, wherein the intra chroma prediction mode information of the current block is determined according to a predefined table based on the intra prediction mode for the luma sample and the intra prediction mode for the chroma sample, wherein, based on the intra prediction mode for the chroma sample being equal to the intra prediction mode for the luma sample, the intra chroma prediction mode information has a specific value.

* * * * *